US012531135B2

(12) United States Patent
Heuer

(10) Patent No.: US 12,531,135 B2
(45) Date of Patent: Jan. 20, 2026

(54) METHODS OF ESTIMATING GAMETE VARIATION

(71) Applicant: Inguran, LLC, Navasota, TX (US)

(72) Inventor: Claas Heuer, Heidmoor (DE)

(73) Assignee: Inguran, LLC, Navasota, TX (US)

(*) Notice: Subject to any disclaimer, the term of this patent is extended or adjusted under 35 U.S.C. 154(b) by 699 days.

(21) Appl. No.: 16/023,764

(22) Filed: Jun. 29, 2018

(65) Prior Publication Data

US 2019/0005189 A1 Jan. 3, 2019

Related U.S. Application Data

(60) Provisional application No. 62/527,838, filed on Jun. 30, 2017.

(51) Int. Cl.
C12N 15/00 (2006.01)
G16B 20/00 (2019.01)
G16B 20/20 (2019.01)
G16B 20/40 (2019.01)
G16B 40/00 (2019.01)

(52) U.S. Cl.
CPC ............ *G16B 20/20* (2019.02); *G16B 20/00* (2019.02); *G16B 20/40* (2019.02); *G16B 40/00* (2019.02)

(58) Field of Classification Search
CPC ................ A01K 67/00; A01K 2217/15; A01K 2227/101; A01K 2267/00; G16B 20/00; G16B 20/40; G16B 40/00
See application file for complete search history.

(56) References Cited

U.S. PATENT DOCUMENTS

| 7,407,750 | B2* | 8/2008 | Blott | C12Q 1/6888 435/6.1 |
| 7,807,361 | B2* | 10/2010 | Khatib | C12Q 1/6876 435/6.1 |
| 8,551,703 | B2* | 10/2013 | Medrano | C12Q 1/6883 435/6.11 |
| 2007/0015164 | A1 | 1/2007 | Khatib | |
| 2012/0004112 | A1 | 1/2012 | Lund | |
| 2016/0309685 | A1 | 10/2016 | Genus | |

FOREIGN PATENT DOCUMENTS

| CN | 106779076 A | 5/2017 |
| WO | 2017/066622 A2 | 4/2017 |

OTHER PUBLICATIONS

Wiggans (J. Dairy Sci, 2011, vol. 94, p. 6188-6193).*
Bennewitz, J., and T.h.e. Meuwissen. "The Distribution of QTL Additive and Dominance Effects in Porcine F2 Crosses." Journal of Animal Breeding and Genetics 127, No. 3, Jun. 1, 2010.
Qanbari, S., E. C. G. Pimentel, J. Tetens, G. Thaller, P. Lichtner, A. R. Sharifi, and H. Simianer. "The Pattern of Linkage Disequilibrium in German Holstein Cattle." Animal Genetics 41, No. 4, Aug. 1, 2010.
Van Raden, "Efficient Methods to Compute Genomic Predictions," Dairy Science 91, 4414-4423 2008.
Gaillard et al., "The primary structure of bovine satellite 1.715." Nucleic Acids Res 9 , No. 22, 6069-82 Nov. 25, 1981.
Miller S A et al. "A Simple Salting out Procedure for Extracting DNA from Human Nucleated Cells", Nucleic Acids Res., vol. 16, p. 1215, 1988.
Biase et al. "Protocol for Extraction of Genomic DNA from Swine Solid Tissues." Genetics and Molecular Biology, 25, No. 3, 313-315 (2002).
Habier, D. et al. "The Impact of Genetic Relationship Information on Genome-Assisted Breeding Values" Genetics 177: 2389-2397 Dec. 2007.
Ma, Li."Cattle Sex-Specific Recombination and Genetic Control from a Large Pedigree Analysis." PLoS Genet 11, No. 11. Nov. 5, 2015.
Segelke, Dierck. "Prediction of Expected Genetic Variation Within Groups of Offspring for Innovative Mating Schemes." Genetics Selection Evolution 46, No. 42, 2014.
Fergusan et al. "Linear Programming: Fundamentals and Applications." McGraw-Hill, 1958.
Falconer, Douglas S., and Mackay, Trudy. Introduction to Quantitative Genetics. 4th edition. Essex, England: Benjamin Cummings, 1996.
EP Extended Search Report issued on May 21, 2021 in related EP Appl. No. 18822812.6.
International Search Report and Written Opinion dated Jun. 29, 2018 issued in related PCT Appl. No. PCT/US18/40353.
Bennet Cassell: "The All-Breed Animal Model", Virginia Cooperative Extension Publication 404-086, May 1, 2009.
Van Der Werf, EBV Accuracy. Jul. 29, 2016.
Stock et al. "Genomic Selection: Status in Different Species and Challenges for Breeding" Reprod Dom Anim 48 (Suppl. 1), 2-10 (2013).
Office Action issued in counterpart Argentinian application No. 20180101779, issued on May 31, 2024 (4 pages).
Wiggans, G. R., Cooper, T. A., VanRaden, P. M., & Cole, J. B. (2011). Technical note: Adjustment of traditional cow evaluations to improve accuracy of genomic predictions. Journal of Dairy Science, 94(12), 6188-6193. https://doi.org/10.3168/jds2011-4481.
Office Action issued in counterpart European application No. 188228126, dated Jun. 5, 2024 (10 pages).
Bennet Cassell: "The All-Breed Animal Model", Virginia Cooperative Extension Publication 404-086, May 1, 2009 (May 1, 2009), XP055555557, Retrieved from the Internet: URL:https://pubs.ext.vt.edu/content/dam/pubs_ext_vt_edu/404/404-086/404-086_pdf.pdf [retrieved on Aug. 21, 2025].

(Continued)

Primary Examiner — Michael C Wilson
(74) Attorney, Agent, or Firm — Ryan Christensen; Hashim Rahman

(57) ABSTRACT

The invention encompasses a method of estimating a distribution or a standard deviation of breeding values or predicted transmitting abilities of gametes from an individual using population-wide estimates of linkage disequilibrium for one or more genetic markers or genes, so as to more efficiently produce offspring having breeding values or predicted transmitting abilities that equal or exceed a desired breeding value or predicted transmitting ability.

2 Claims, 14 Drawing Sheets

(56) References Cited

OTHER PUBLICATIONS

Office Action issued in counterpart Mexican application No. MX/a/2020/000137, dated Jul. 6, 2023 (4 pages).
Office Action issued in counterpart Mexican application No. MX/a/2020/000137, dated Oct. 9, 2024 (9 pages).
Office Action issued in counterpart Mexican application No. MX/a/2020/000137, dated Apr. 14, 2025 (8 pages).
Laido Giovanni et al: "Linkage Disequilibrium and Genome-Wide Association Mapping in Tetraploid Wheat (*Triticum turgidum* L.)", PLoS ONE, vol. 9, No. 4, Apr. 23, 2014 (Apr. 23, 2014), p. e95211, XP93051526, DOI: 10.1371/journal.pone.0095211 Retrieved from the Internet: URL:https://www.ncbi.nlm.nih.gov/pmc/articles/PMC3997356/pdf/pone.0095211.pdf.

* cited by examiner

METHODS OF ESTIMATING GAMETE VARIATION

CROSS-REFERENCE TO RELATED APPLICATIONS

This application claims priority to U.S. Provisional Applications 62/527,838 filed Jun. 30, 2017, the contents of which are all incorporated by reference in their entireties

BACKGROUND OF THE INVENTION

Breeding values are average effects that arise in a defined population. Variation of descendants arises from random mating and Mendelian segregation during meiosis. Mendelian segregation results in variation of breeding values in gametes and is the main driver of variation in full siblings. The greater the variation in breeding values in gametes of an individual, the higher the likelihood that such an individual will produce offspring having extreme breeding values. Unfortunately, unless one exclusively is working with double haploid lines, meiotic outcomes (i.e., variability) cannot be predicted.

Because the genotypic outcome of a mating cannot be predicted due to Mendelian segregation, there is a need to estimate gamete variation of an individual's gametes.

SUMMARY OF THE INVENTION

One embodiment of the invention encompasses estimating a distribution or a standard deviation of i) breeding values or ii) predicted transmitting abilities (PTAs) of gametes from an individual using population-wide estimates of linkage disequilibrium for one or more genetic marker or gene. In a further embodiment, the step of estimating is independent of genotype imputation, haplotype estimation or recombination information. In yet a further embodiment, the step of estimating is performed by establishing a set of markers or genes for which genotype data is available for the individual and wherein marker effects or gene effects are estimated for the set of markers or genes.

A further embodiment of the invention encompasses a method of producing offspring from an individual in a population comprising estimating a distribution or a standard deviation of i) breeding values or ii) PTAs of gametes from an individual using population-wide estimates of linkage disequilibrium for one or more genetic markers or genes; selecting the individual for breeding based on the estimated distribution or estimated standard deviation of breeding values or PTAs of the gametes; breeding the individual; and producing offspring from the breeding. In a further embodiment of the invention, the step of selecting comprises selecting the individual for breeding based upon an estimated standard deviation of breeding values or PTAs of the gametes that exceeds an average standard deviation of a distribution of standard deviations of breeding values or PTAs of gametes of the population by at least one standard deviation from the average. In a further embodiment, the step of estimating is independent of genotype imputation, haplotype estimation or recombination information. In yet a further embodiment, the step of estimating is performed by establishing a set of markers or genes for which genotype data is available for the individual and wherein marker effects or gene effects are estimated for the set of markers or genes.

Another embodiment of the invention encompasses a method of producing offspring from an individual in a population comprising estimating a standard deviation of i) breeding values or ii) PTAs of gametes from an individual using population-wide estimates of linkage disequilibrium for one or more genetic markers or genes; calculating a probability of generating gametes from the individual that have desired breeding values or PTAs; selecting the individual for breeding based on the calculated probability; breeding the individual; and producing offspring from the breeding. In a further embodiment, the desired breeding values or PTAs exceed an average breeding value or PTA of the population. In another embodiment, the desired breeding values or PTAs exceed an average breeding value or PTA of the population by one or more standard deviations from the average. In yet another embodiment, the desired breeding values or PTAs fall within the top 20 percent of breeding values or PTAs of the population. In a further embodiment, the step of estimating is independent of genotype imputation, haplotype estimation or recombination information. In yet a further embodiment, the step of estimating is performed by establishing a set of markers or genes for which genotype data is available for the individual and wherein marker effects or gene effects are estimated for the set of markers or genes.

An additional embodiment is drawn to a method of estimating a distribution or a standard deviation of i) breeding values or ii) PTAs (predicted transmitting abilities) of gametes from a male of the species, and from a female of the species, using population-wide estimates of linkage disequilibrium for one or more genetic markers or genes; and calculating a probability that offspring produced from a mating of the male and the female will have a breeding value or PTA that equals or exceeds a desired breeding value or PTA. In a further embodiment, the step of estimating is independent of genotype imputation, haplotype estimation or recombination information. In yet a further embodiment, the step of estimating is performed by establishing a set of markers or genes for which genotype data is available for the individual and wherein marker effects or gene effects are estimated for the set of markers or genes.

Yet another embodiment is drawn to a method of optimizing a breeding program comprising one or more males and one or more females from a population, the method comprising providing an objective function, wherein said objective function is defined by a first variable comprising a vector of probabilities to generate offspring having a breeding value or a PTA equal to or greater than a desired breeding value or PTA for every male-female combination from the one or more males and the one or more females, and a second variable comprising a vector of integers representing a number of matings for every male-female combination from the one or more males and the one or more females; applying one or more linear constraints to the first or the second variable; and determining a vector of integers representing the number of matings for every male-female combination that maximizes the objective function given the linear constraints. In further embodiments, the desired breeding value or PTA exceeds an average breeding value or PTA of the population; the desired breeding value or PTA exceeds an average breeding value or PTA of the population by one or more standard deviations from the average; or the desired breeding value or PTA falls within the top 20 percent of breeding values or PTAs of the population. This embodiment can also further comprise the step of estimating a distribution or a standard deviation of i) breeding values or ii) PTAs (predicted transmitting abilities) of gametes from the one or more males or the one or more females using population-wide estimates of linkage disequilibrium for one or more genetic markers or genes. In a further embodiment, the step of estimating is independent of genotype imputation, haplotype estimation or recombination information. In yet a further embodiment, the step of estimating is performed by establishing a set of genetic markers or genes for which genotype data is available for the individual and wherein genetic marker effects or gene effects are estimated for the set of genetic markers or genes. In still yet a further embodiment, the one or more linear constraints is selected from the group consisting of: a maximum or minimum number of matings for each male or each female; a maximum or minimum number of matings for each male-female combination; a maximum or minimum number of offspring for a male or a female; and a maximum number of offspring for each male-female combination. In an additional embodiment, the step of determining the vector of integers representing the number of matings for every male-female combination that maximizes the objective function comprises using a simplex method. Finally, a further embodiment comprises the steps of breeding a male from the one or more males and a female from the one or more females with each other when the integer representing the number of matings for that male-female combination is equal to or greater than 1; and producing offspring from the breeding.

The various embodiments of the invention may be applied to, or comprise, individuals or species of non-human mammals, and the invention should be understood not to be limited to the species of non-human mammals described by the specific examples within this application. Rather the specific examples within this application are intended to be illustrative of the varied and numerous species of non-human mammals to which the methods of the invention may be applied. Embodiments of the invention, for example, encompass animals having commercial value for meat or dairy production such as swine, ovine, bovine, equine, deer, elk, buffalo, or the like (naturally the mammals used for meat or dairy production may vary from culture to culture). They also encompass various domesticated non-human mammalian species such as canines and felines, as well as primates, including but not limited to chimpanzees, and gorillas, as well as whales, dolphins and other marine mammals.

The terms "breeding" and "mating" as used herein encompass any method or technique known in the art for fertilizing an oocyte, including natural insemination, as well as any assisted reproductive technology know in the art, including but not limited to artificial insemination, in vitro insemination and intracytoplasmic sperm injection.

DETAILED DESCRIPTION OF THE INVENTION

Due to Mendelian segregation, the genotypic outcome of a mating cannot generally be predicted. However, the instant invention allows one to select from a large pool of (unborn) full siblings to generate matings that result in highly variable full siblings, increasing the likelihood of producing strongly superior progenies.

In the absence of genomic information, the infinitesimal model can serve as a framework for the distribution of quantitative trait loci (QTL) in the population and gametes. This model assumes that the additive genetic variance of a particular trait in the population stems from an unknown and infinite number of QTL with certain gene substitution effects that are fixed given a certain base population. Variation at bi-allelic QTL arises because of minor allele frequencies different from 0. The additive genetic variance can be formalized as:

$$\mathrm{Var}(\hat{g}_{gametes_i}) = \sigma_{g_i}^2 = \Sigma 2pq\hat{a}_i^2$$

Where i is the number of QTL segregating in the population, p and q are vectors of allele frequencies of biallelic QTL and α is a vector of allele substitution effects of QTL.

In the absence of knowledge of the actual QTL and allele frequencies, the infinitesimal model assumes that every QTL contributes equally to the additive genetic variance. A consequence of this assumption is that the Mendelian sampling variance observable in a group of offspring from a particular sire and dam is solely a function of their heterozygosity, which is then equal to the fraction of QTL for which the parents are heterozygous.

The Mendelian sampling variance of an offspring becomes:

$$Var(MS)=0.5\sigma_\alpha^2-0.25(F_s+F_d)\sigma_\alpha^2$$

where $F_s$ and $F_d$ are the inbreeding coefficients of the sire and dam, respectively. In the absence of inbreeding, the Mendelian sampling variance of an animal is equal to $0.5\sigma_\alpha^2$.

Figure 1:
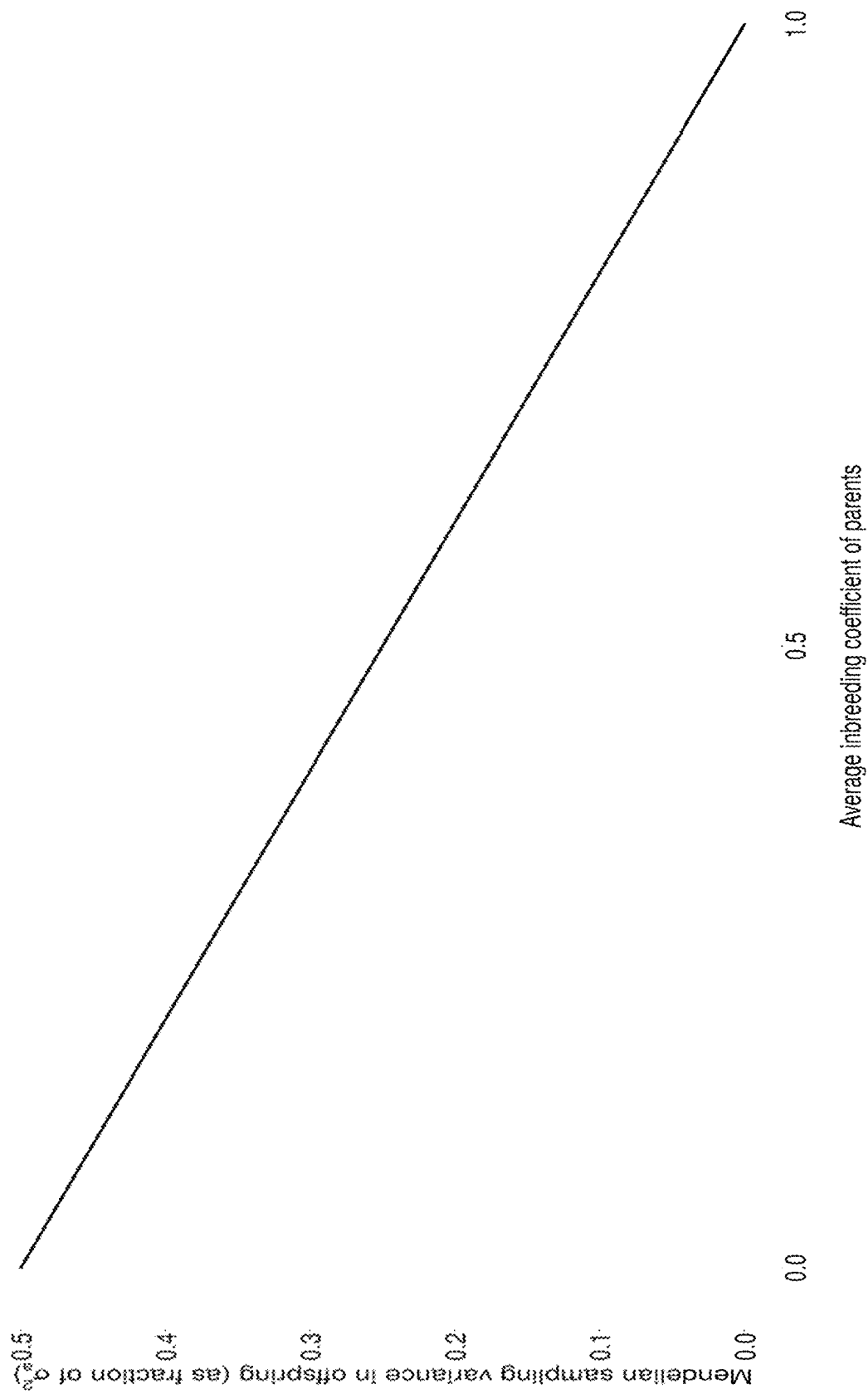
FIG. 1 is a graph showing the linear relationship between parental inbreeding and Mendelian sampling variance.

In FIG. 1 the linear relationship between parental inbreeding and Mendelian sampling variance is illustrated. When inbreeding is perfect (1), the Mendelian sampling variance becomes 0.

The infinitesimal model is a simplification of the inheritance of QTL in the absence of genomic information. In reality, the number of QTL is not infinite and, therefore, the effects of those QTL cannot be infinitely small. In fact, a limited number of QTL contribute substantial additive genetic variation for a given quantitative trait. Therefore, the Mendelian sampling variance can no longer be a simple linear function of general heterozygosity (inbreeding), because the location of heterozygosity matters as well.

In the presence of genomic information in the form of single nucleotide polymorphisms (SNP), the breeding values of animals can be estimated using the following mixed model $$y=Xb+Zu+\epsilon,$$

where y is the vector of phenotypic observations, X is a design matrix for fixed effects, and Z is a design matrix for the SNP marker covariates. The solution vector of the marker effects u is distributed as $MVN(0,I\sigma_u^2)$ and the error term $\epsilon$ as $MVN(0,I\sigma_\epsilon^2)$.

The estimated breeding value of individual i is:

$$\hat{g}_i=z_i\hat{u}$$

with $z_i$ being the marker covariates {0,1,2}, $\hat{u}$ being some estimate of marker effects and $\widehat{\mu_g}$ being the population mean, i.e., $\widehat{\mu_g}=\bar{z}\hat{u}$. Accordingly, it follows that the average breeding value of its gametes is: $\widehat{\mu_{g_i}}=\hat{g}_i/2$
all gametes will have the same allele for homozygous loci; and
variation in the gametes arises only from loci for which the individual is heterozygous.

Accordingly, in order to estimate gamete variation of breeding values, only the heterozygous loci need to be taken into consideration.

If all of the QTL were known and there was no linkage disequilibrium (LD) between them, the Mendelian sampling variance of animal i can be estimated as:

$$Var(\hat{g}_{gametes_i})=\sigma_{g_i}^2=\sum 0.25\hat{u}_{z_i=1}^2$$

where the summation is over the heterozygous genotypes ($z_i$=1) only. The formula is taking the marker effects as fixed and randomness only arises through Mendelian sampling of heterozygous genotypes. For any heterozygous SNP genotype, the variation in the population of gametes stems from the effective allele frequencies of 0.5. The contribution to the variation of breeding values in the population of gametes for a given SNP marker becomes the product of the variance of the random variable and the constant marker effect to the power of 2. The random variable is the Bernoulli event of drawing one out of the two possible alleles at a given loci with equal probability (0.5). The variance of such a Bernoulli random variable is $p(1-p)=0.5^2=0.25$.

Figure 2:
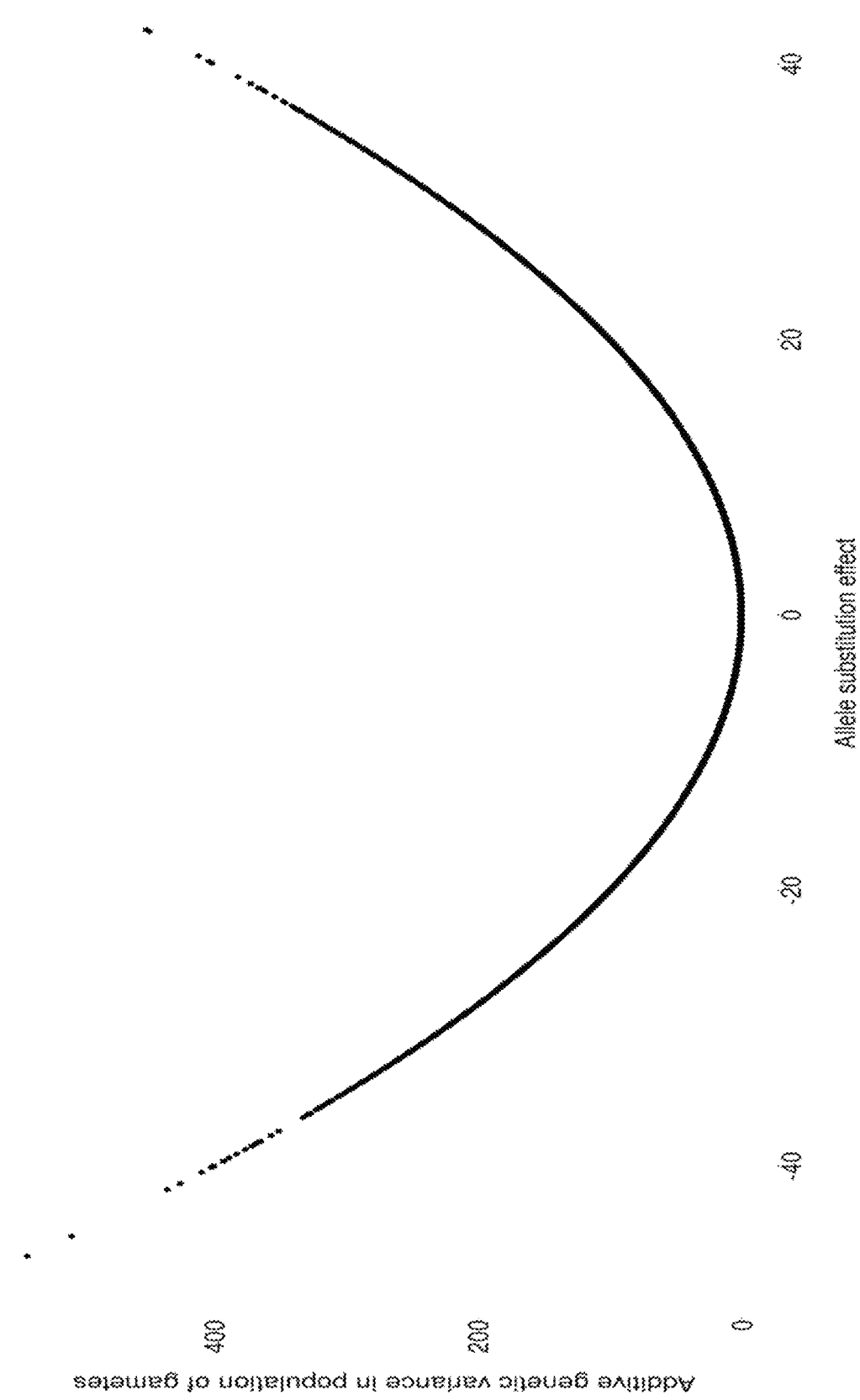
FIG. 2 is a graph showing additive genetic variance from single SNP markers as a function of the effect size.

It becomes clear that the contribution of every single marker to the variation of breeding values in gametes only depends on the effect size (u), as all heterozygous markers have the same allele frequency in the population of gametes. In FIG. 2 the additive genetic variance in gametes given the marker effects is visualized. It becomes apparent that the infinitesimal model is inappropriate in the presence of heterogeneous effect sizes of markers. See Bennewitz, J., and T.h.e. Meuwissen. "The Distribution of QTL Additive and Dominance Effects in Porcine F2 Crosses." Journal of Animal Breeding and Genetics 127, no. 3 (Jun. 1, 2010): 171-79. doi:10.1111/j.1439-0388.2009.00847.x.

A "breeding value" generally constitutes a value twice the average deviation of an animal's offspring group for a given trait from the population mean. A "parent average" generally constitutes the average of an animal's parents' breeding values, or the sum of the parents' PTAs. "Genetic markers" generally constitute identifiable (i.e., typable) regions on the genome for which there is variation in the population. "Estimated genetic marker effects" generally constitute the effects of an allele substitution at an anonymous genetic marker on the genotypic value of an animal given a reference population. An "estimated gene effect" generally constitutes the effect of an allele substitution at a known QTL on the genotypic value of an animal given a reference population.

Estimating the Distribution of Breeding Values in Gametes

Assuming the breeding values of sire and dam are known without error and the marker effects come from a common distribution ($MVN(0,I\sigma_u^2)$), the distribution of breeding values in a population of gametes can be described as:

$$\hat{g}_{Offspring_{a,b}} \sim N(\hat{\mu}_{g_a}+\hat{\mu}_{g_b},\sigma_{g_a}^2+\sigma_{g_b}^2)$$

The expected value of that distribution is simply the parent average, while the variance is the sum of the gamete variances of both parents (it is assumed that there is no covariance between the gamete variances of the parents).

Based on this distribution, a series of metrics can be computed that include quantiles of breeding values; probabilities to exceed certain thresholds; and numbers of pregnancies necessary to obtain a given number of animals in quantiles.

If the breeding values in gametes do not follow a normal distribution, an estimate of the mean and standard deviation of the breeding values is not sufficient to describe the distribution. In that case the formula given earlier does not apply and the distribution can be derived by Monte Carlo integration by simulating a large population of gametes. This can be achieved by sampling marker genotypes according to Mendelian sampling and the dependence between markers through linkage disequilibrium. The empirical distribution of the breeding values from the simulated population of gametes can then be used to derive quantiles and other metrics of interest.

Gamete Variances Accounting for LD

The assumption of independence between a large number of SNP markers does not hold. See Qanbari, S., E. C. G. Pimentel, J. Tetens, G. Thaller, P. Lichtner, A. R. Sharifi, and H. Simianer. "The Pattern of Linkage Disequilibrium in German Holstein Cattle." Animal Genetics 41, no. 4 (Aug. 1, 2010): 346-56. doi:10.1111/j.1365-2052.2009.02011.x. This means that SNPs co-segregate in haplotypes, which results in covariances different from zero for neighboring SNP markers.

In order to take this co-segregation (family LD) into account, one can either estimate family specific recombination rates or get a population wide approximation through LD using a certain reference population.

LD (see Falconer, Douglas S., and Trudy F. C. Mackay. Introduction to Quantitative Genetics. $4^{th}$ edition. Essex, England: Benjamin Cummings, 1996) is essentially the squared correlation between marker covariates of two SNP markers. According to the instant invention, this correlation can be transformed into a covariance on the meiotic level, by multiplying the empirical correlation matrix by 0.25:

$$Cor(Z) = \frac{Z'Z}{(n-1)}$$

where Z is a matrix of scaled marker covariates.

According to the instant invention, the covariance on the meiotic level (all allele frequencies equal to 0.5) becomes:

$$Cor(Z)*0.25$$

According to the instant invention, the variance in breeding values in the population of gametes for individual i is then:

$$Var(\hat{g}_{gametes_i}) = \sigma_{g_i}^2 = \hat{u}'_{z_i}{}^{-1} Var(z_{z_i=1}) \hat{u}_{z\_i=1}$$

Use of the Invention in a Breeding Program

The instant invention allows one to predict and optimize the outcome of matings. In Holstein dairy cattle breeding, for example, it is of tremendous importance to rank animals according to a breeding value. A genetic evaluation can be expressed as either a PTA or an estimated breeding value (EBV). Both are measures of performance relative to a base population, with an individual's PTA simply being one half of the EBV. A PTA indicates the difference in performance that can be expected from an animal's daughters relative to that base; an EBV is the genetic merit of the animal itself relative to the base and, therefore, is twice the PTA. Genomic EBVs (GEBVs) and genomic PTAs (GPTAs) are simply estimated breeding values and predicted transmitting abilities that incorporate genomic data, including genomic relationships, as commonly derived from SNP data. As used herein, the terms "EBV" and "PTA" encompass GEBV and GPTA, respectively. While the gamete variances can be used for the prediction of the whole EBV distribution of an offspring group, breeders are mainly interested in the very right tail of that distribution, meaning the probabilities of an EBV exceeding the parent average by 2 or 3 standard deviations. The term "breeding value" as used herein encompasses EBVs.

The instant invention can be used to optimize the allocation of limited resources for the generation of offspring exceeding certain thresholds or other criteria. One of the main limitations in breeding programs is the number of animals that can be genomically evaluated throughout a year. Certain technologies such as amniotic fluid sampling (as disclosed in PCT/US2016/057115, which is hereby incorporated by reference in its entirety) and fetal tissue sampling boost the number of animals that can be genomically evaluated in a given year. Estimated variation in gametes for the breeding animals in accordance with the instant invention allows optimization of mate allocation. One embodiment of the invention encompasses optimization of matings based on an index (i.e. combination of traits). This is achieved by estimating the genetic correlation of marker effects across traits. This allows one to predict the probability of generating offspring exceeding a certain EBV threshold, while not exceeding a certain expected future inbreeding.

Impact of Imputation

Only the heterozygous loci contribute to the variation in gametes. Therefore, false imputation will have an impact on the results of estimation of gamete variability. Accordingly, one aspect of the instant invention is to establish the estimation of gamete variances independently of genotype imputation. This is achieved by, for example, establishing a certain reference population with at least 50 k genotypes and re-estimating marker effects for either every chip panel or even for the actual genotypes for every single individual. The benefits of this aspect of the invention are two-fold: first, one does not have to worry about imputation error, and second, this allows instant prediction of genomic breeding values and gamete variances as soon as the data is available.

Figure 3:
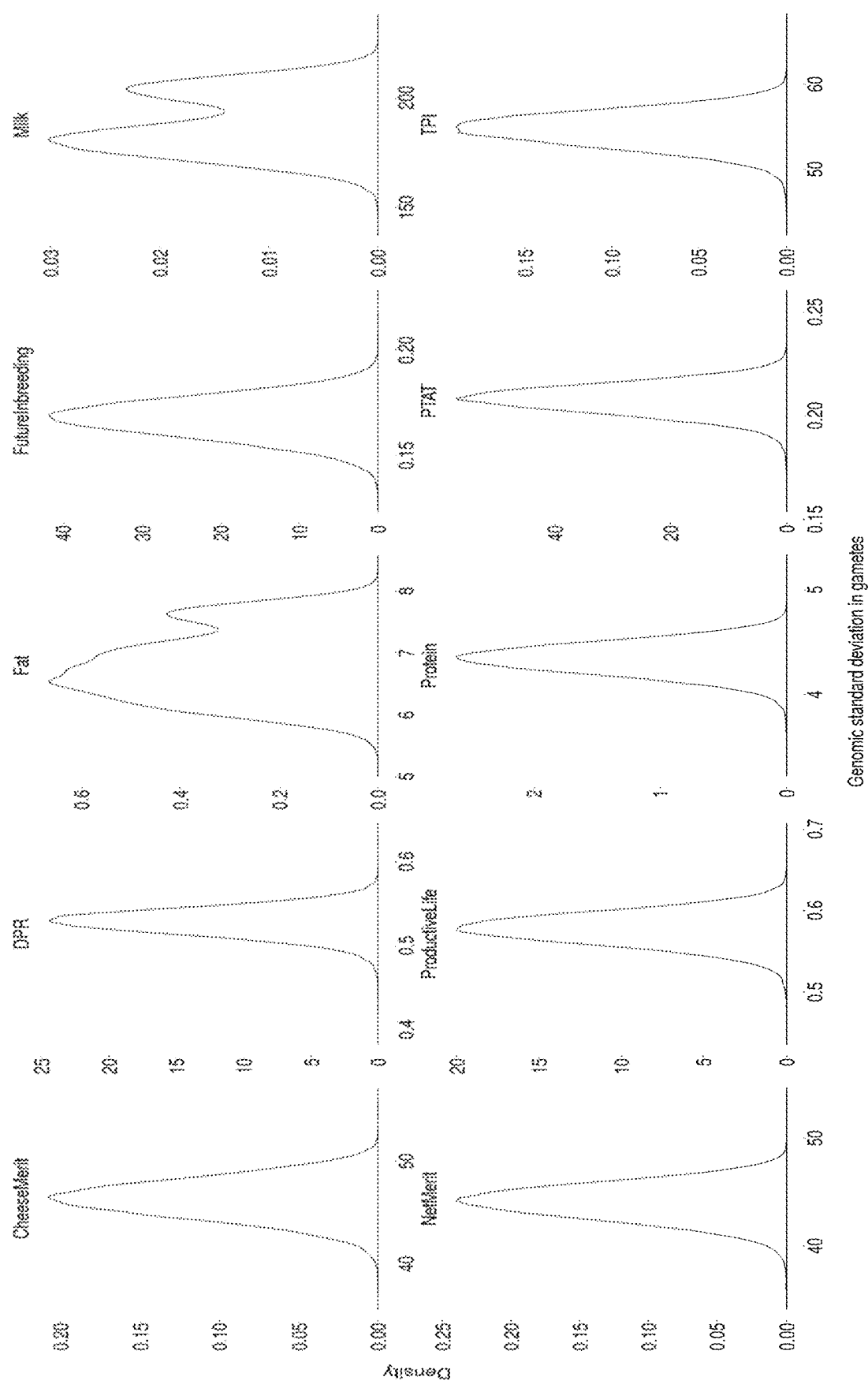
FIG. 3 is a series of graphs showing the density of genomic standard deviation in gametes for certain dairy cattle traits.
Figure 4A:
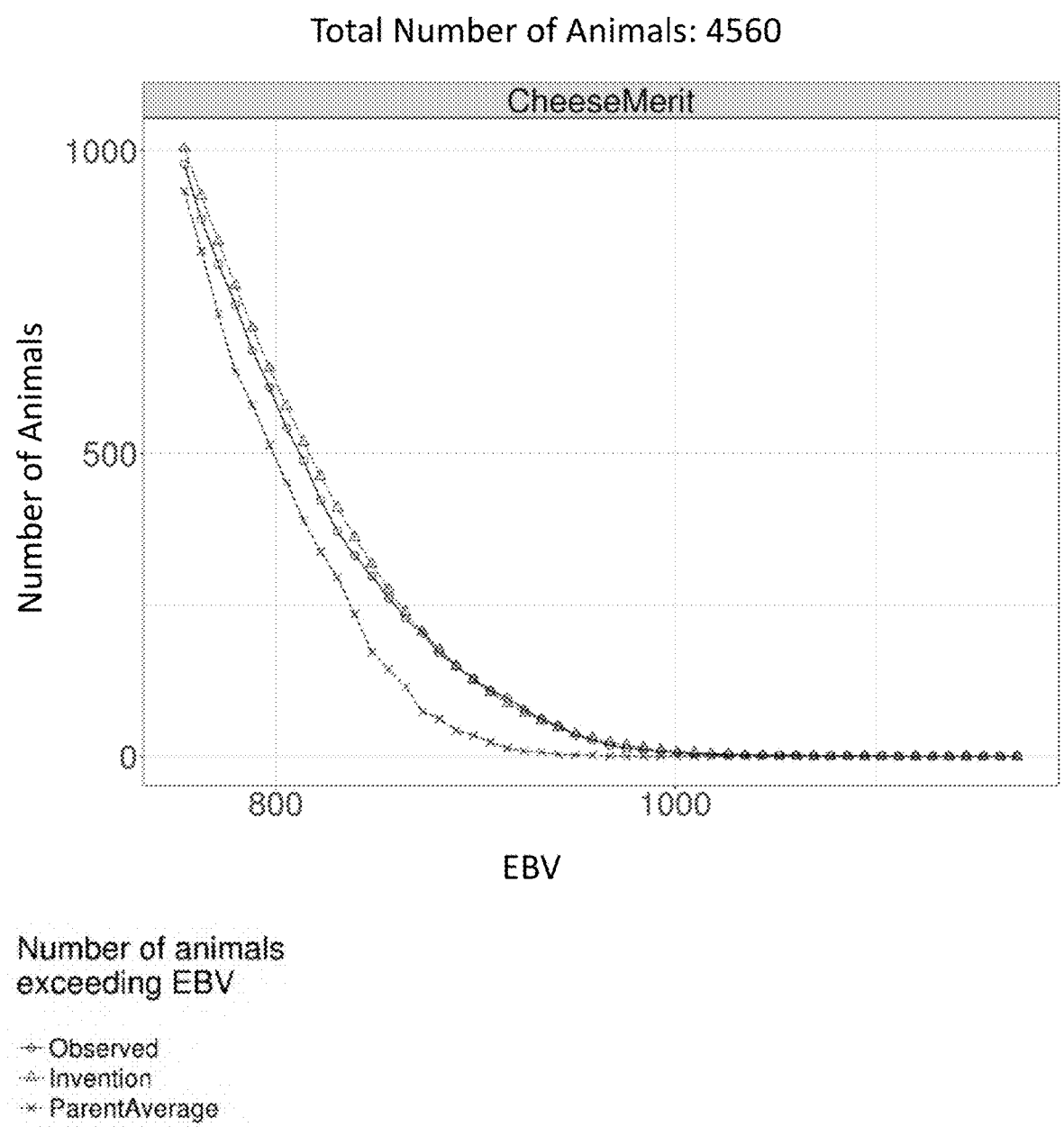
FIG. 4A shows the top 10 to 20% of given animals and the predicted (by the invention or alternatively by the parent average) and the observed number of dairy animals that exceed thresholds given by the x-axis for the Cheese Merit index.
Figure 4B:
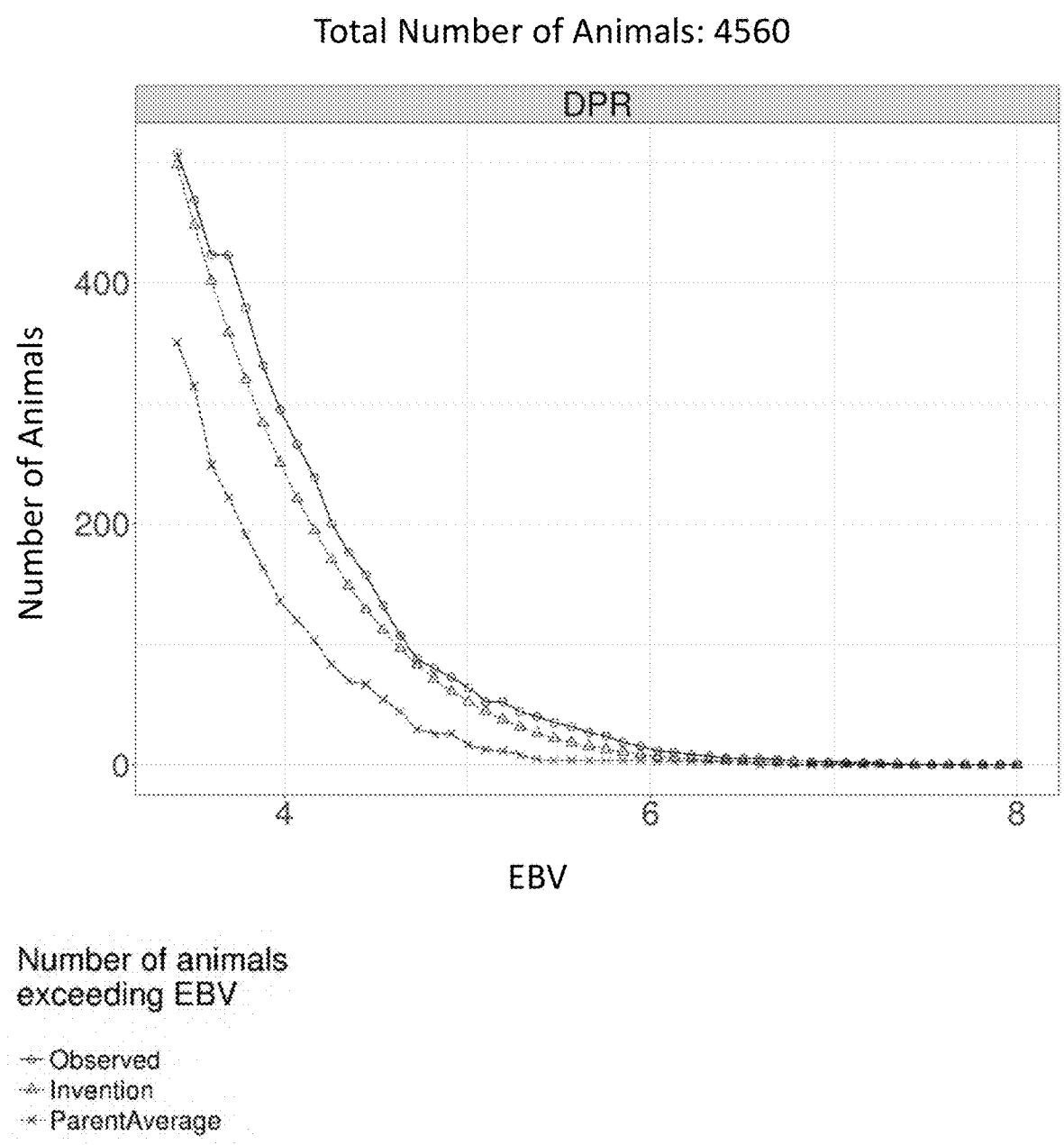
FIG. 4B shows the top 10 to 20% of given animals and the predicted (by the invention or alternatively by the parent average) and the observed number of dairy animals that exceed thresholds given by the x-axis for the daughter pregnancy rate ("DPR") trait.
Figure 4C:
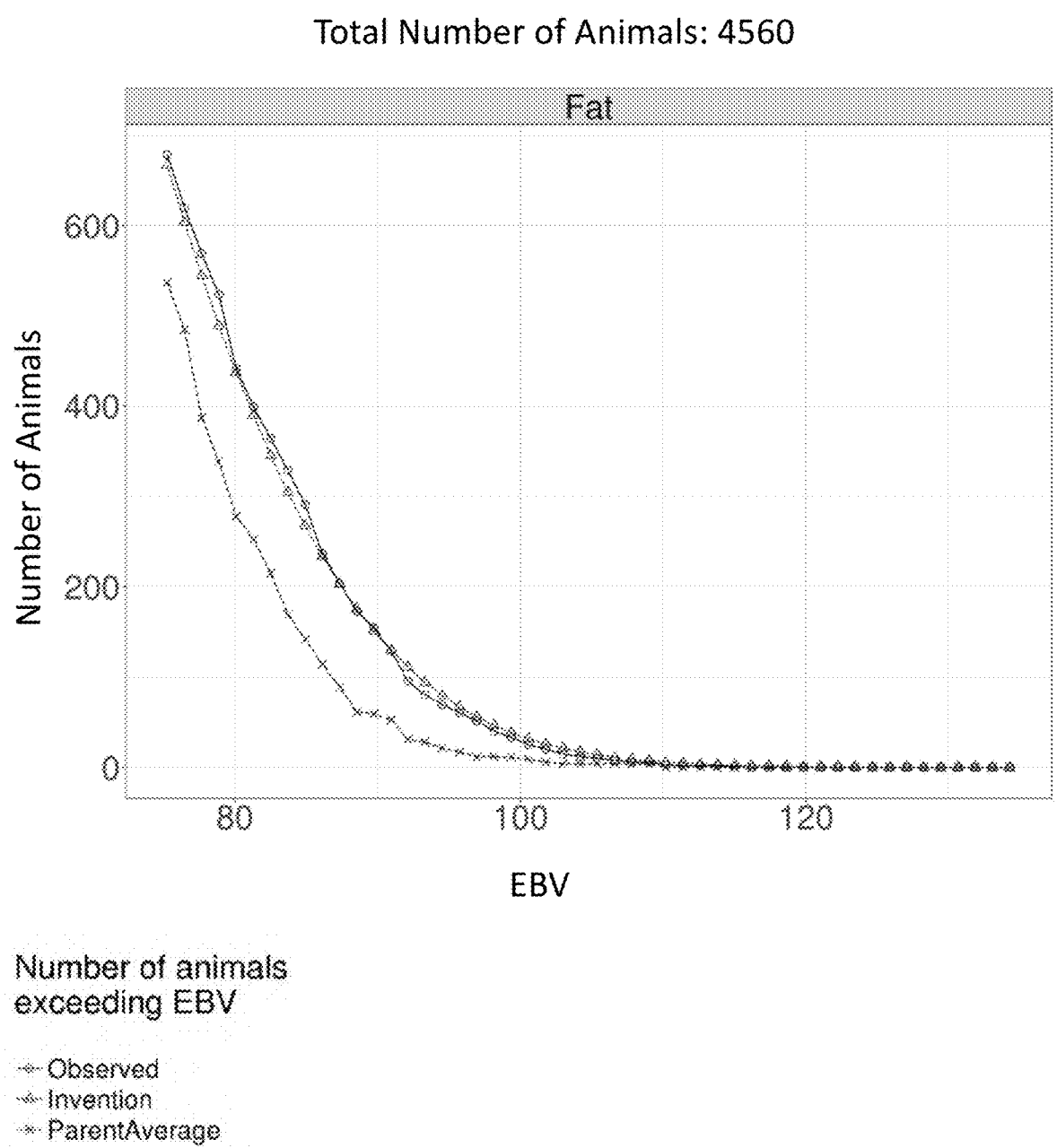
FIG. 4C shows the top 10 to 20% of given animals and the predicted (by the invention or alternatively by the parent average) and the observed number of dairy animals that exceed thresholds given by the x-axis for the Fat trait.
Figure 4D:
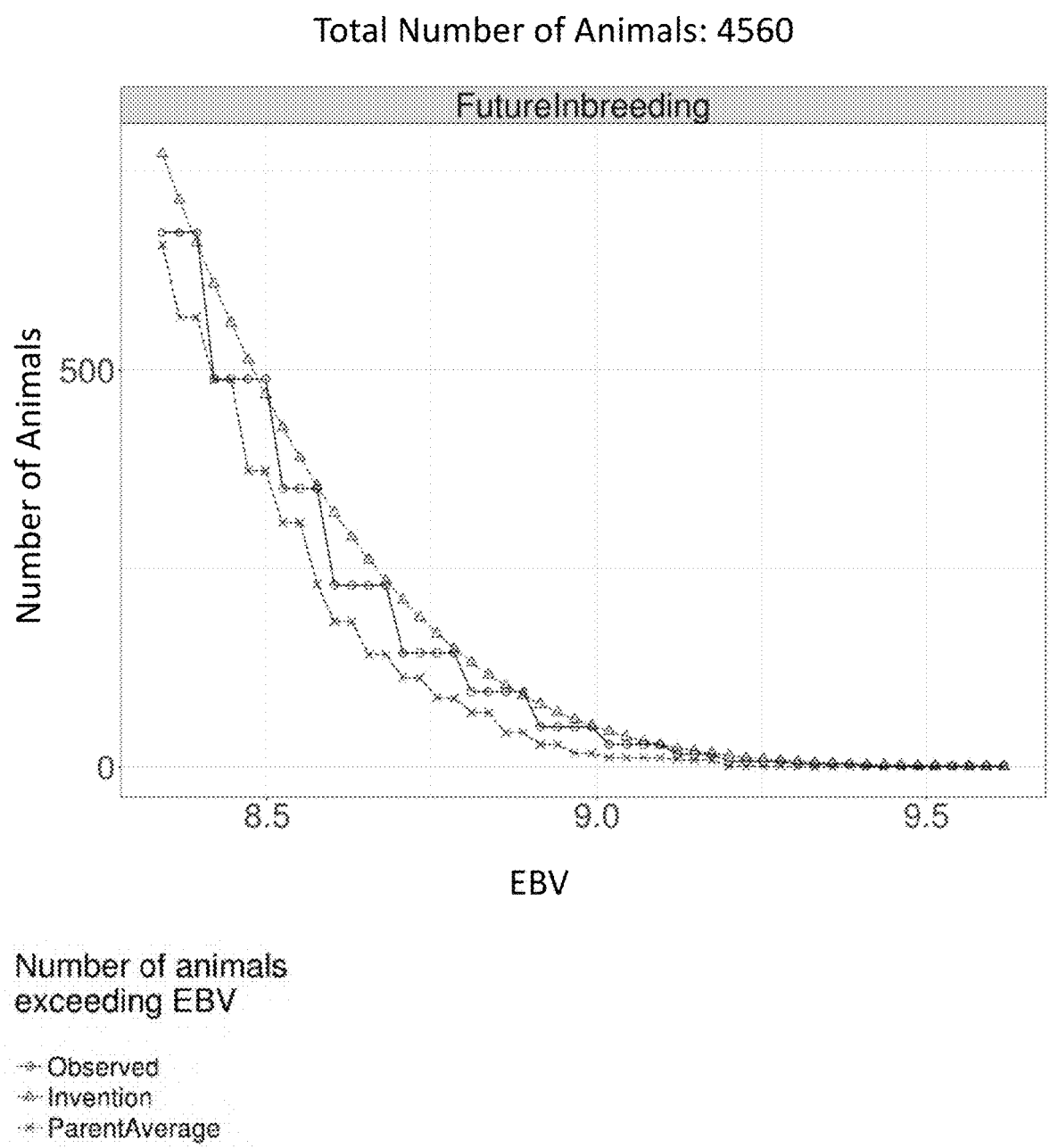
FIG. 4D shows the top 10 to 20% of given animals and the predicted (by the invention or alternatively by the parent average) and the observed number of dairy animals that exceed thresholds given by the x-axis for Future Inbreeding.
Figure 4E:
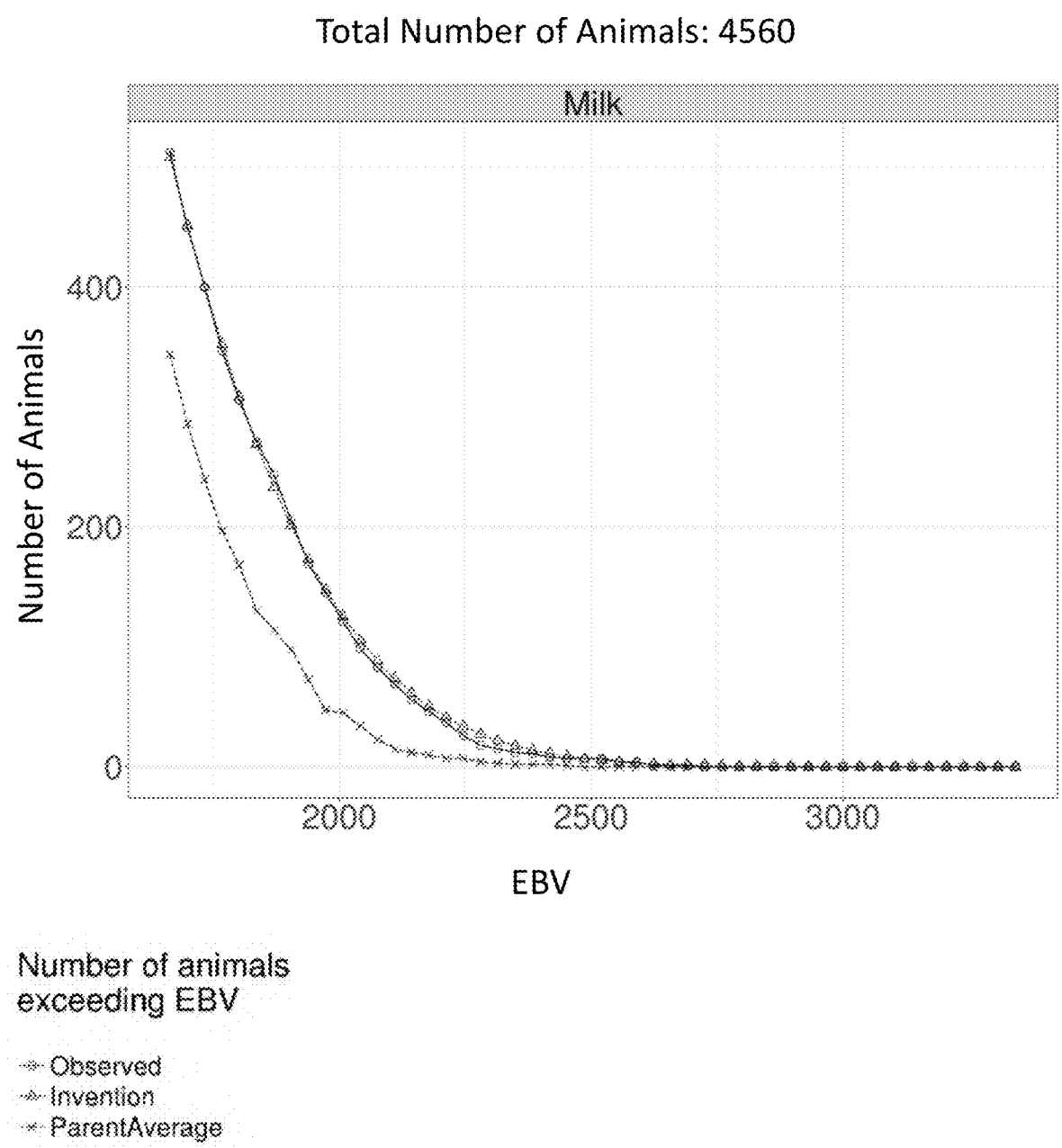
FIG. 4E shows the top 10 to 20% of given animals and the predicted (by the invention or alternatively by the parent average) and the observed number of dairy animals that exceed thresholds given by the x-axis for the Milk trait.
Figure 4F:
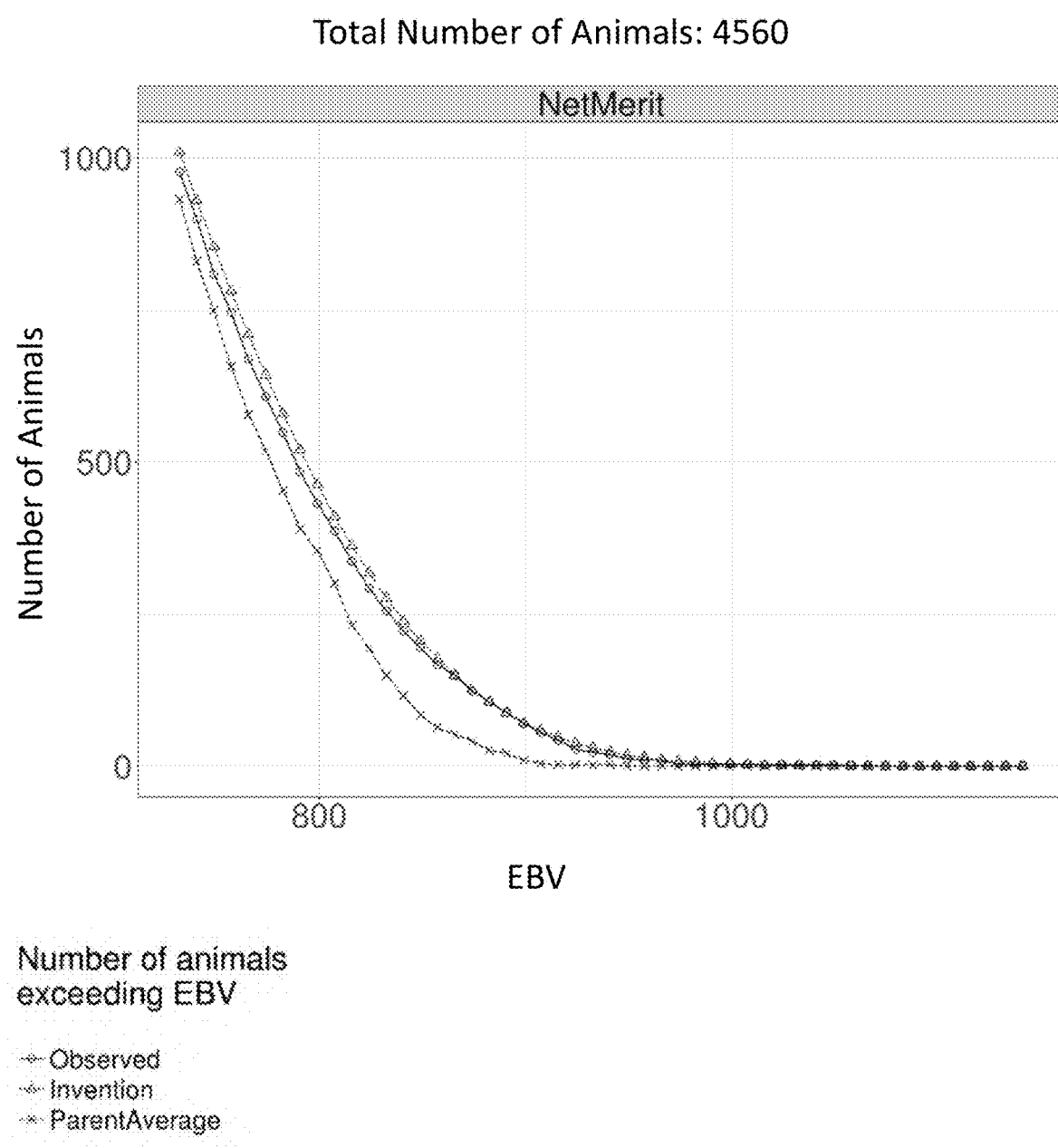
FIG. 4F shows the top 10 to 20% of given animals and the predicted (by the invention or alternatively by the parent average) and the observed number of dairy animals that exceed thresholds given by the x-axis for the Net Merit index.
Figure 4G:
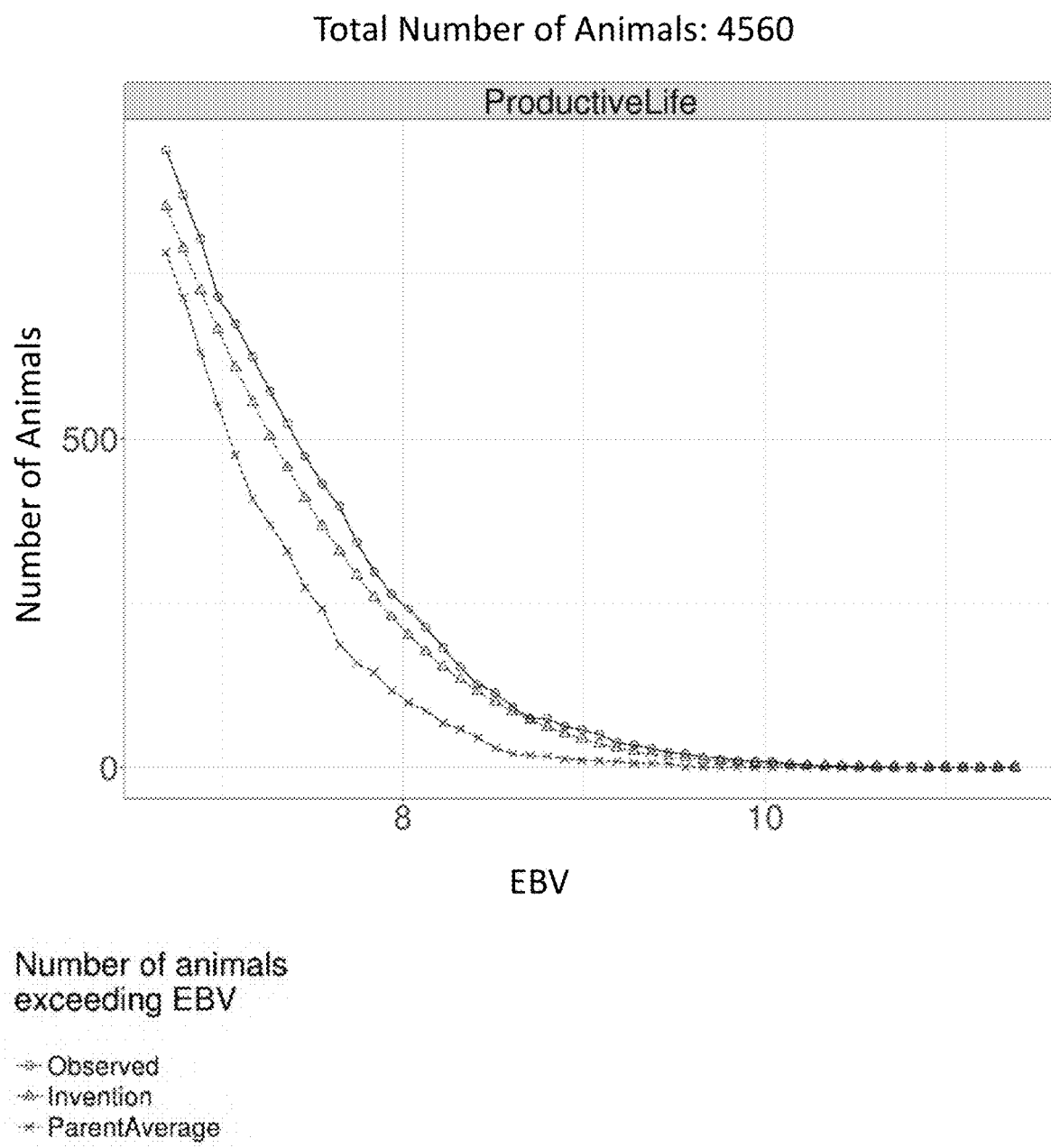
FIG. 4G shows the top 10 to 20% of given animals and the predicted (by the invention or alternatively by the parent average) and the observed number of dairy animals that exceed thresholds given by the x-axis for the Productive Life trait.
Figure 4H:
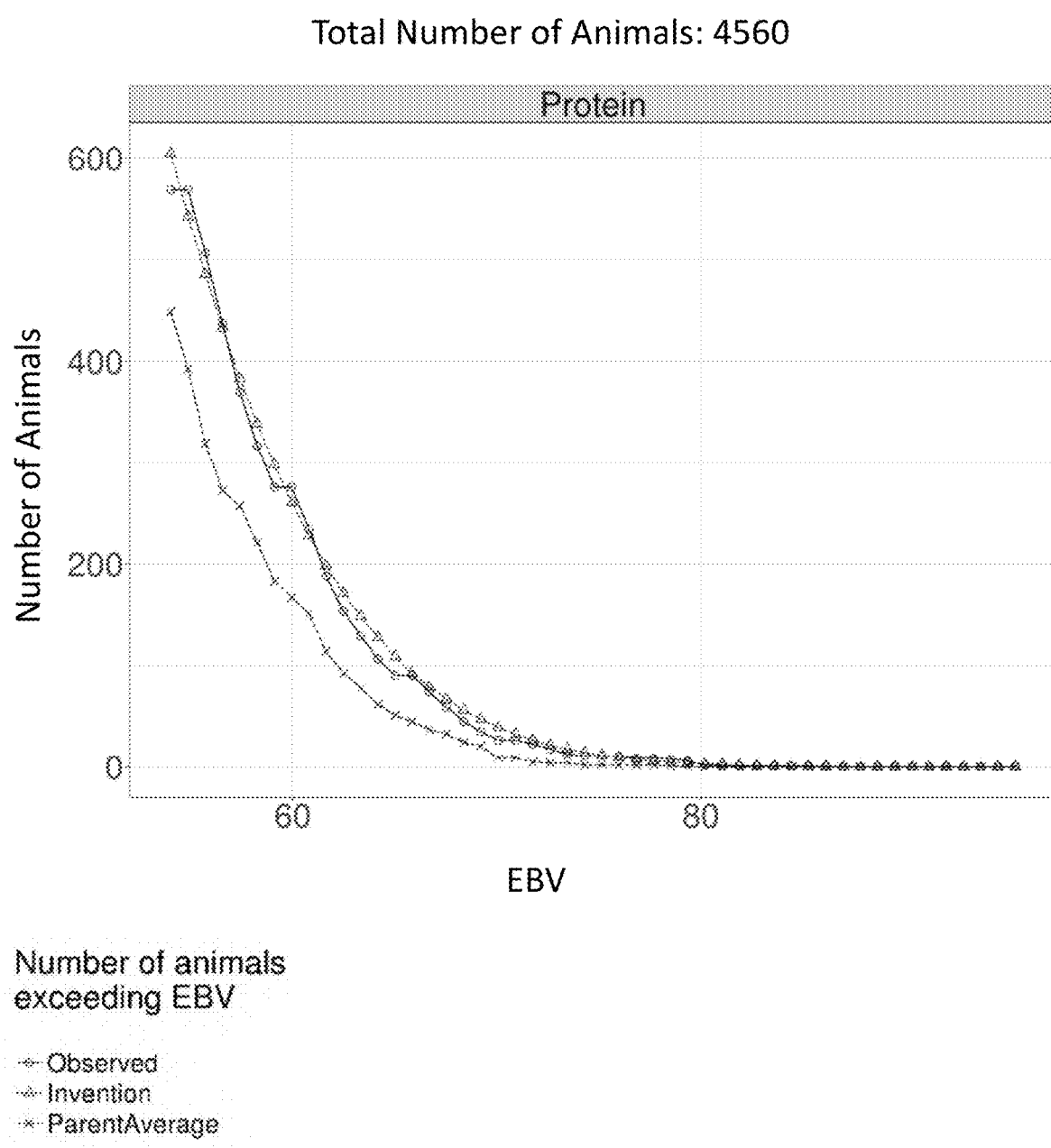
FIG. 4H shows the top 10 to 20% of given animals and the predicted (by the invention or alternatively by the parent average) and the observed number of dairy animals that exceed thresholds given by the x-axis for the Protein trait.
Figure 4I:
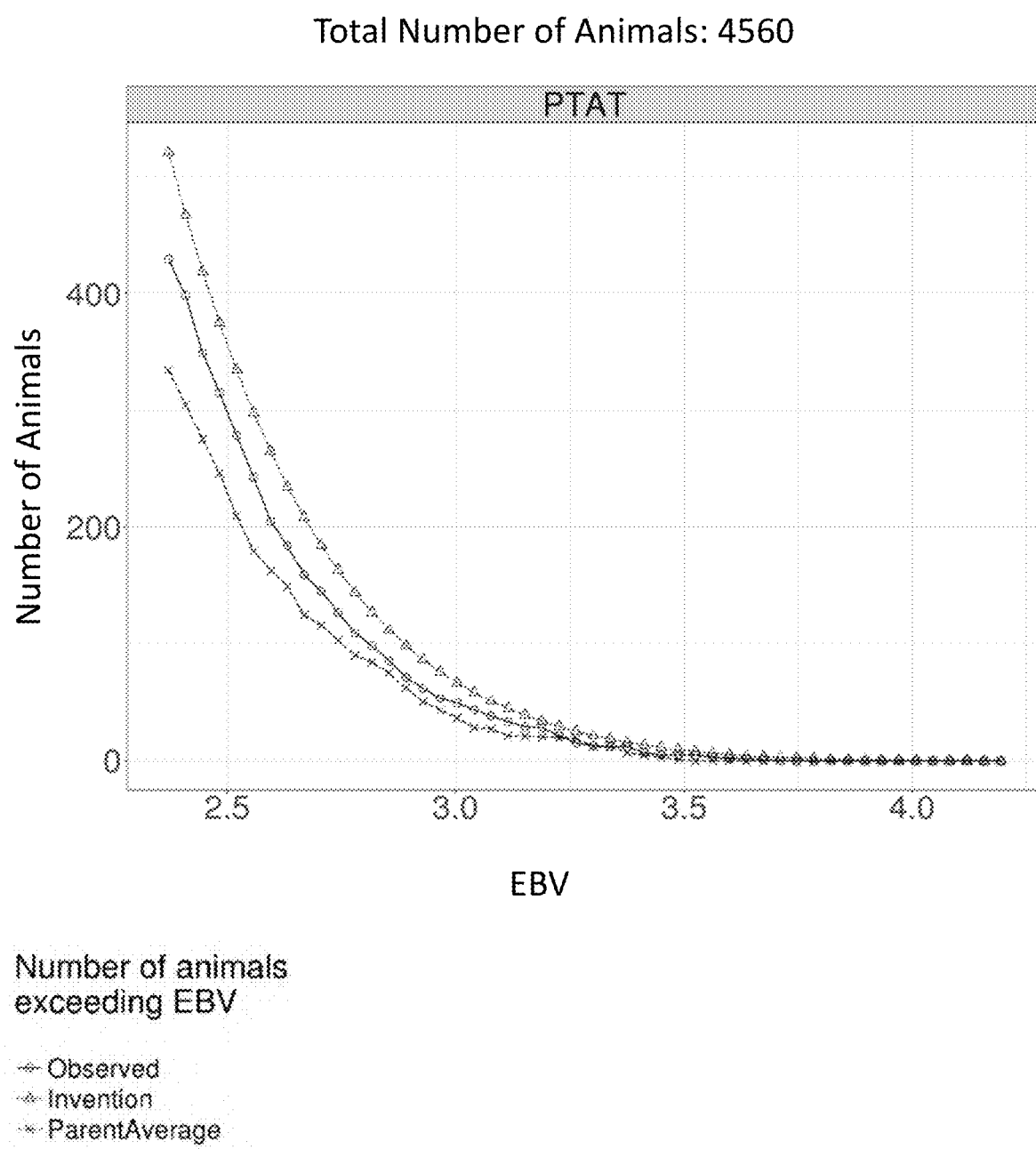
FIG. 4I shows the top 10 to 20% of given animals and the predicted (by the invention or alternatively by the parent average) and the observed number of dairy animals that exceed thresholds given by the x-axis for PTA Type ("PTAT").
Figure 4J:
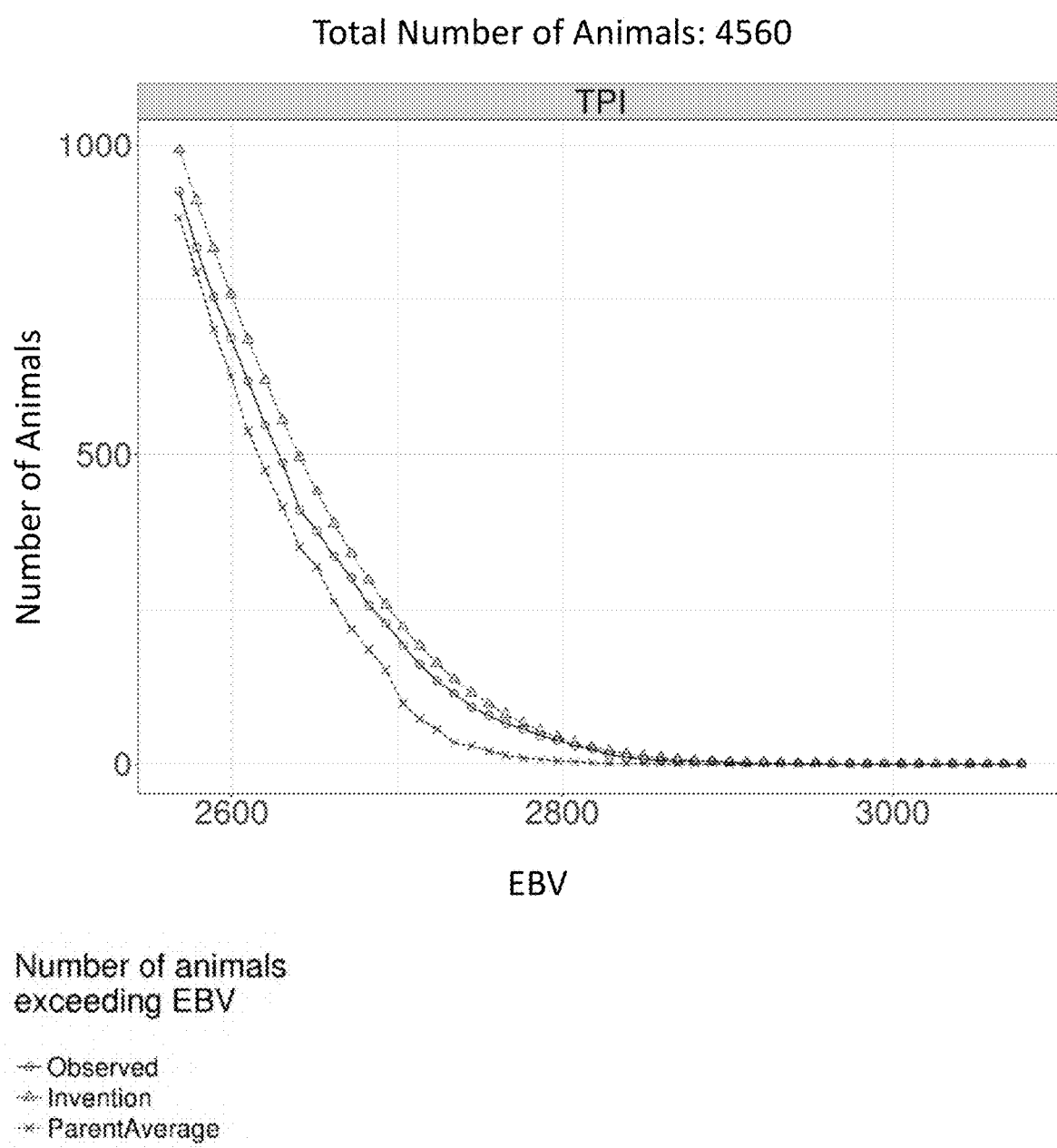
FIG. 4J shows the top 10 to 20% of given animals and the predicted (by the invention or alternatively by the parent average) and the observed number of dairy animals that exceed thresholds given by the x-axis for TPI® ("Total Performance Index®").

In FIG. 3, the distributions of genomic standard deviations in the gametes of all individuals across certain dairy traits are displayed.

Embryo Production In Vivo and In Vitro

In certain embodiments of the invention, embryos to be genomically evaluated may be produced in vivo by traditional methods for synchronized supernumerary follicle production, artificial insemination (AI) and scheduled non-surgical transvaginal catheterized intrauterine embryo recovery. In other aspects of the invention, in vitro produced embryos may be produced in the laboratory by non-typical harvest of oocytes, IVF and embryo culture methodologies. In peripubertal heifers, prophase I immature cumulus oocyte complexes (COCs) are recovered from live standing females by using ultrasound guided transvaginal oocyte recovery (TVOR) system, also referred to as ovum pickup (OPU). In prepubertal heifers, ultrasound guided laparoscopic OPU is employed for COC recovery. When immature COCs are brought into the laboratory, they are placed into typical in vitro maturation (IVM) culture system where the most developmentally capable oocytes undergo spontaneous and programmed meiosis. After an overnight culture period, those oocytes that progress through meiosis I (and accordingly shed their second polar body progressing to metaphase of the second meiotic division) and are morphologically normal (including an intact plasma membrane) are used in IVF. Mature oocytes from individual females are placed into traditional IVF drops and mated to specific sires, using highly screened and accurate sperm capacitation treatments and sperm concentration per oocyte fertilized. Zygotes (day 1) are placed into traditional co-culture system and cultured to uterine stages of development by day 7-8 of culture. Embryos are typically transported to a recipient heifer farm where they are non-surgically transferred. Prior to transfer, embryos may be biopsied or sampled for genetic screening and/or genomic evaluation. Within certain specific stages of embryo development, embryos can be disaggregated/dismantled and used in embryo multiplication procedures and/or cryopreserved for later use. Embryos destined for transfer to synchronized surrogate females are transported to the farm in culture and non-surgically transferred by traditional methods. In certain embodiments, the invention contemplates that recipient females are regularly checked by veterinarians and ongoing pregnancies are monitored on a regular and scheduled basis via transrectal real time ultrasonography.

Embryo Transfer

Although not necessarily required, certain embodiments of the invention encompass embryo transfer. Specifically, in some embodiments, fetal cell samples are obtained from amniotic fluid of a recipient animal into which an embryo has been placed via embryo transfer. In other embodiments of the invention, embryo transfer is used to transfer a cloned embryo into a recipient. Any method known in the art may be used to transfer an embryo into a recipient, including any known surgical or non-surgical method. In alternative embodiments, fetal cell samples are obtained from fetuses that are conceived and that gestate entirely in vivo.

The following surgical and non-surgical methods of embryo transfer are provided by way of non-limiting example only.

In cattle, an embryo can be transferred via mid-line abdominal incision, or a flank incision, to a recipient under general anesthesia. Recipients are placed in squeeze chutes that give access to either flank. The corpus *luteum* is located by rectal palpation and the flank ipsilateral to the corpus *luteum* is clipped, washed with soap and water, and sterilized with iodine and alcohol. About 60 ml of 2 percent procaine is given along the line of the planned incision. A skin incision is made about 15 cm long, high on the flank, just anterior to the hip. Muscle layers are separated, and the peritoneum is cut. The surgeon inserts a hand and forearm into the incision, locates the ovary, generally about 25 cm posterior to the incision, and visualizes or palpates the corpus *luteum*. The uterine horn is exteriorized by grasping and stretching with the thumb and forefinger the broad ligament of the uterus, which is located medial to the uterine horn. A puncture wound is made with a blunted needle through the wall of the cranial one-third of the exposed uterine horn. Using about 0.1 ml of medium in a small glass pipette (<1.5 mm outside diameter), the embryo is drawn up from the storage container. The pipette is then inserted into the lumen of the uterus, and the embryo is expelled. The incision is then closed, using two layers of sutures.

Alternatively, a non-surgical method may be used to transfer an embryo in cattle. First, it is necessary to palpate ovaries in order to select the side of ovulation, since pregnancy rates are lowered if embryos are transferred to the uterine horn contralateral to the corpus *luteum*. Recipients should be rejected if no corpus *luteum* is present or pathology of the reproductive tract is noted. The next step is to pass the embryo transfer device, e.g., a standard Cassou inseminating gun, through the cervix. The third step of non-surgical transfer is to insert the tip of the instrument into the desired uterine horn ipsilateral to the corpus *luteum*. The final step of the procedure is to transfer the embryo from a container, such as a straw, into the desired uterine horn using the transfer device.

Collection of Amniotic Fluid

Certain embodiments of the invention encompass methods of collecting amniotic fluid. Once amniotic fluid is collected, a further aspect includes isolating fetal cells from the amniotic fluid and performing genomic analysis on DNA extracted from the fetal cells. Any method known in the art for collection of amniotic fluid may be used in the invention, including but not limited to trans-vaginal/trans-uterine collection using either ultrasound guided or manual puncture techniques. Additionally, amniotic fluid may be collected at any time during gestation in a mother or embryo transfer recipient, including from day 45 through parturition, or between day 1 to day 10, day 20 to day 30, 30 to day 280, day 40 to day 100, day 50 to day 80, day 60 to day 70, day 70 to day 80, day 80 to day 90, day 90 to day 100, day 100 to day 120, day 70 to day 90, day 75 to day 80, day 75 to day 90, day 70 to day 85, or day 120 to day 280, of gestation.

By way of example, the following collection procedure may be used in the invention. One skilled in the art will know that variations on this method exist and that this method should not be construed to limit the functionality or scope of the current invention. This method is illustrative only.

Obtain a bovine mother, or recipient, with a fetus on day 65 to day 250 of gestation. Administer standard caudal epidural anesthesia with 2% lidocaine. Raise the animals approximately 40 cm at the front using a platform in order to place the reproductive tract back towards the pelvis. Clean and disinfect the vulva region and inside of the vaginal vaults several times with iodine. Trans-rectally retract the uterus with the opposite hand and juxtapose the pregnant horn against the vaginal wall. Insert an ultrasound-transducer covered with a sterile sleeve into the vaginal vault with the aid of light lubrication approximately to the level of the cervix. Aspirate the fetal fluid by intra-vaginal placement of a needle (Ø=1.3 mm, 68 cm length) installed within the body of the ultrasound-transducer and connected to a vacuum-tube blood collection assembly. Ultrasound scanner may be equipped with a 5.0 MHz convex type transducer approximately 1.6 cm wide and 58 cm long. Advance the needle through the vaginal and uterine walls by sharply moving the vacuum tube over a distance of about 3 to 4 cm. If the syringe plunger meets resistance, reposition the needle and take another aspirate. Transfer the aspirate was to a sterile 10 ml test tube, placed on ice, and submit for DNA analysis. Confirm successful needle placement by direct observation of ultrasonography and fetal fluid swirling within the vacuum tube. Fetal viability may be assessed between 7 to 10 days after the aspiration procedure. Imaging of either independent fetal movement or heart beat may be taken as proof of viability.

Another collection method in pregnant cattle encompasses the use of ultrasound-guided transvaginal oocyte recovery (TVOR) equipment, specialized fluid recovery tubing, and adapted filter collection system. In this example, in all cattle destined for amniocentesis, pregnancy is confirmed and fetal sex determined by transrectal ultrasonography at specific periods after embryo transfer, implantation and the completion of organogenesis. By day 45-100, or more specifically day 75-80, of the first trimester of gestation, ultrasound-guided transvaginal oocyte recovery equipment is adapted and used to visualize the entire fetus and amniotic vesicle in a uterine horn during aspiration. Prior to collection, the heifers are restrained in stocks and sedated prior to performing amniocentesis. The veterinary staff performing amniocentesis use complete sterile procedures, including powder free nitrile gloved hands and ethanol sterilization of equipment. To ensure that the area is free of contamination before insertion of the transducer, the rectum is emptied of feces, and under epidural anesthesia the vulva and rectal area of the cow are thoroughly cleaned and scrubbed. The disinfection step is completed by rinsing the vulva and rectal area with Betadine solution and the rinsing and spraying the cleaned area with 70% ethanol. The TVOR equipment is cleaned and sterilized with ethanol immediately prior to its introduction into the vagina and is fitted with a sterile stainless steel single-needle guide. The TVOR equipment is advanced into the vagina, positioned to the left or the right of the cervical os and by means of manipulation per rectum, the pregnant uterine horn is positioned against the probe, avoiding interposition of other tissue in the proposed needle path. The exact location of the amniotic sac is determined by the recognition of fetal body parts, the allantoamniotic and allantochorionic membranes and the uterine wall. When a non-echogenic area representing amniotic fluid is seen on the monitor screen, a sterile needle with a stylette is inserted within the needle guide and advanced penetrating through the vaginal wall, uterus and subsequent fetal membranes. As soon as the tip of the needle is seen to have entered the fetal fluid compartment, the stylette is withdrawn from the needle and the needle is placed inside the amnion of the fetus. An initial 5-10 ml of fetal fluid is aspirated into the tubing and flushed out of the tubing system to reduce or eliminate maternal contamination. An amniocentesis filter is attached to the tubing and an additional 30-40 ml of amniotic fluid is aspirated. During the fluid collection, the pregnant uterine horn is held in the same position, and the exact location of the tip of the needle is guaranteed by its visualization on the ultrasound screen. When samples from more than 1 heifer are collected on the same day, the needle-guide is replaced by a sterile one, and the transducer is thoroughly cleaned and disinfected before being used on the next animal. After collection of amniotic fluid is completed in an animal, the collected fluid in the filter system is placed on ice and transported back to the cell culture laboratory.

Isolating Amniocytes from Amniotic Fluid

The term "amniocytes" as used herein, refers to cells obtained from amniotic fluid, as well as to cells cultured from cells obtained from amniotic fluid. Amniocytes, including fetal fibroblasts and amniotic fluid-derived mesenchymal stem cells (AFMSCs), used in the present invention may be obtained from, e.g., amniotic fluid from amniocentesis performed for fetal karyotyping, or amniotic fluid obtained at term. For purposes of the invention, amniocytes may be isolated from the amniotic fluid by any method known in the art, e.g., by centrifugation followed by removal of the supernatant.

Amniocyte Cell Culture

One aspect of the invention encompasses culturing isolated amniocytes. Cultured amniocytes can in turn be used in various applications, including genotyping and for producing clones. By way of example, the following culturing procedure may be used in certain embodiments of the invention. One skilled in the art will know that variations on this method exist and that this method should not be construed to limit the functionality or scope of the current invention. This method is illustrative only.

Amniocytes are centrifuged (200 g, 10 min) at room temperature and the pellet is gently resuspended in Chang medium. Cells are plated into 100 mm gelatinized Petri dishes and left undisturbed. Media is changed every 3-4 days. After 2 weeks in culture, they are trypsinized to disperse cells and allow their growth in a monolayer. Amniocytes are cultured at 37° C. in a humidified 5% $CO_2$ atmosphere. Cells are passaged at a ratio 1:4 every 5 days until they reach 80% confluence. For subsequent passages, the media is aspirated, washed with PBS, detached with 0.05% trypsine for 5 min at 37° C.

Isolation and Culture of Amniotic Fluid-Derived Mesenchymal Stem Cells

In certain embodiments of the invention, a two-stage culture method may be used to isolate, culture, and enrich amniotic fluid-derived mesenchymal stem cells (AFMSCs) from amniotic fluid obtained by amniocentesis. Mammalian mesenchymal stem cells are presumptively multipotent cells that have the potential to differentiate into multiple lineages including bone, cartilage, muscle, tendon, ligament fat and a variety of other connective tissues. Morphologically, mesenchymal stem cells in their undifferentiated state are spindle shaped and resemble fibroblasts. Mesenchymal stem cells have been identified mostly in bone marrow, but have also been found in both adult and fetal peripheral blood, fetal liver, fetal spleen, placenta and in term umbilical cord blood. Significantly, mesenchymal stem cells can be found in mammalian amniotic fluid. Under specific culture conditions, mammalian AFMSCs have been induced to differentiate into adipocytes, osteocytes and neuronal cells.

The two-stage culture protocol comprises a first stage of culturing amniocytes, and a second stage of culturing mesenchymal stem cells. The method begins by setting up primary cultures using cytogenetic laboratory amniocytes culture protocol. Non-adhering amniotic fluid cells in the supernatant medium are collected. For culturing mesenchymal stem cells, the non-adhering cells are centrifuged and then plated in a culture flask with an alpha-modified Minimum Essential Medium supplemented with fetal bovine serum. For mesenchymal stem cell growth, the culture is incubated with humidified $CO_2$.

By way of example, the following specific culturing procedure may be used in certain embodiments of the invention. One skilled in the art will know that variations on this method exist and that this method should not be construed to limit the functionality or scope of the current invention. This method is illustrative only.

For culturing amniocytes, set up four primary in situ cultures in 35 mm tissue culture-grade dishes using Chang medium (Irvine Scientific, Santa Ana, Calif.). Collect non-adhering amniotic fluid cells in the supernatant medium on the 5th day after the primary amniocytes culture and keep them until a completion of fetal chromosome analysis.

For culturing mesenchymal stem cells, centrifuge the tube containing the non-adhering cells, then plate them in 5-15 ml of alpha-modified Minimum Essential Medium (α-MEM) supplemented with 10-20% fetal bovine serum (FBS) and 1-20 ng/ml b-FGF in a 25 cm2 culture flask and incubate at 37° C. with 5% humidified $CO_2$ for mesenchymal stem cell growth.

Flow cytometry, RT-PCR, and immunocytochemistry may be used to analyze the phenotypic characteristics of the cultured mesenchymal stem cells. Von Kossa, Oil Red O and TuJ-1 stainings may be used to assess the differentiation potentials of the mesenchymal stem cells.

The following additional culture method is presented by way of example only. The invention contemplates sterile technique, including being gloved with non-powder nitrile gloves to process amniotic fluid. In certain embodiments of the invention, the entire process is performed in a cell culture laminar flow biosafety cabinet and only food grade ethanol is used in washing gloved hands whenever needed or possible.

Fluid and amniocytes are aspirated by pipette into 15 ml conical tubes. The collection filter is rinsed with culture medium to remove any adhered cells and repeated as necessary to remove a maximal amount of amniocytes from the filter. The conical tubes are centrifuged until a cell pellet is formed, supernatant is aspirated, and cells are resuspended in cell culture medium. The cell suspension is thoroughly mixed and pipetted into culture wells and/or dishes. Cell cultures are placed into a cell culture incubator and cultured at 38.7 C in 5% $CO_2$/air for 5 days undisturbed. On day 5 of culture, cell culture dishes are removed from culture and cell culture medium and any floating cells are aspirated and placed into 15 ml centrifuge tube. The remaining cells plated on the original cell culture dishes, primarily fetal fibroblasts and AFMSCs are fed with fresh culture medium and placed back into cell culture incubators and cultured until 80-90% confluent. After reaching confluency, the cells are lifted for passage and/or cryopreservation. The aspirated floating amniocytes can be started in amniocyte-specific cell culture or used in fetal diagnostic testing and/or genomic testing and profiling. Both original plated fetal fibroblast cultures and original floating amniocyte cell cultures can be cultured for indefinite passaging and cryopreservation. Cryopreserved fetal fibroblasts and/or amniocytes can be warmed and passaged or used in cloning procedures.

Fetal Tissue Sampling

In addition, or alternative, to obtaining fetal cells from amniotic fluid, one aspect of the invention also encompasses obtaining a fetal tissue or cell sample directly from the fetus. In one embodiment, the invention encompasses taking an in vivo fetal tissue or cell sample on day 1, 2, 3, 4, 5, 6, 7, 8, 9, 10, 12, 13, 14, 15, 16, 17, 18, 19, 20, 21, 22, 23, 24, 25, 26, 27, 28, 29 or 30 of gestation, or between day 1 to day 10, day 15 to day 25, day 20 to day 30, day 21 to day 26, day 21 to day 23, day 24 to day 26, day 30 to day 40, day 40 to day 50, day 60 to day 70, day 30 to day 280, day 40 to day 100, day 50 to day 80, day 60 to day 70, day 70 to day 80, day 80 to day 90, day 90 to day 100, day 100 to day 120, day 70 to day 90, day 75 to day 80, day 75 to day 90, day 70 to day 85, or day 120 to day 280, of gestation.

The following fetal tissue sampling procedure is presented by way of example only. Any know method for fetal tissue or cell sampling, whether transvaginal, transabdominal, transcervical, or otherwise, is contemplated for use with the invention. Briefly, the recipient or mother undergoes a preliminary ultrasonographic examination to confirm gestational age, determine fetal viability, diagnose multiple pregnancy, diagnose fetal structural abnormalities, determine fetal lie, and/or locate the placenta. The recipient or mother is sedated and the abdomen prepared with an iodine-based solution and alcohol. The skin is infiltrated with a 1% lidocaine hydrochloride solution for local anesthesia. A 16.5 gauge thin-walled needle is introduced into the amniotic cavity under continuous ultrasonographic guidance. The biopsy needle is then inserted into the fetus. Once the needle is in the fetus, a syringe is attached to aspirate cells into the biopsy needle. The tissue is removed from the needle by flushing with saline solution. An ultrasound examination may be done immediately after the procedure to assess fetal viability. Fetal fibroblasts are subsequently isolated from the tissue sample by a standard trypsinization procedure using Try-LE (Life Technologies).

Alternatively, another embodiment of the invention contemplates collecting fetuses from recipients or mothers on day 1, 2, 3, 4, 5, 6, 7, 8, 9, 10, 12, 13, 14, 15, 16, 17, 18, 19, 20, 21, 22, 23, 24, 25, 26, 27, 28, 29 or 30 of gestation, or between day 1 to day 10, day 15 to day 25, day 20 to day 30, day 21 to day 26, day 21 to day 23, day 24 to day 26, day 30 to day 40, day 40 to day 50, day 60 to day 70, day 30 to day 280, day 40 to day 100, day 50 to day 80, day 60 to day 70, day 70 to day 80, day 80 to day 90, day 90 to day 100, day 100 to day 120, day 70 to day 90, day 75 to day 80, day 75 to day 90, day 70 to day 85, or day 120 to day 280, of gestation for genomic analysis by any known technique in the art, including flushing. By way of example only, the following flushing procedure can be utilized in the invention. On day 20 to 26 of gestation, recipient cows are confined in a cattle chute and given an epidural block of 4-6 ml lidocaine. A sterile 20 gauge Foley catheter is inserted through the cervix into the entrance of a horn near the uterine body and the cuff of the catheter is inflated to keep the catheter in position. Vigro Complete Flushing Solution (Bioniche Animal Health) is flushed through the uterus non-surgically while gently squeezing out from the horn of the uterus towards the cervix to expel the fetuses and membranes with the flushing medium. This flushing procedure is then repeated on the contralateral uterine horn. The flushed medium is collected via gravity flow in an EQ way filter (SPI, Canton, TX). The flushed contents and filter are taken to the laboratory and carefully washed onto a square grid search dish under a laminar flow hood, and the embryos are collected using a stereomicroscope. Thereafter, the embryos are disaggregated and individual fibroblast cell lines can be established from the embryos. Cells can be passaged once and cultured from 3 to 5 days to obtain homogenous fibroblast populations.

DNA Extraction and Amplification

Another aspect of the invention encompasses genotyping amniocytes or other fetal cells. Specifically, once fetal fibroblasts or mesenchymal stem cells have been isolated from the amniotic fluid or otherwise obtained through fetal tissue sampling, their DNA may be extracted and used for genotyping. In a specific embodiment, the DNA of cultured fetal fibroblasts or mesenchymal stem cells can be used for genotyping. Fetal fibroblast, or mesenchymal stem cell, DNA may first be extracted and then amplified (via PCR) so that there is a sufficient amount of DNA for genotyping. Alternatively, in some embodiments of the invention, DNA may be extracted directly from amniocytes, including fibroblasts and mesenchymal stem cells, found in amniotic fluid. The invention encompasses embodiments in which the amount of DNA extracted is very low, ranging from 1 ng/μl to 10 ng/μl (based on double strand DNA assays). Visualization using 1% agarose gels has shown the extracted DNA in some examples to be large, ≥23000 MW with little fragmented DNA.

For genomic analysis, approximately 1-200 ng of double stranded DNA should be extracted per sample DNA at concentration per sample of 1-50 ng/ul. In certain embodiments of the invention, only 1 ng/μl to 10 ng/μl of DNA are necessary for genomic analysis. In a particular embodiment, less than 15 ng of DNA total is necessary for genomic analysis. In some embodiments of the invention, the DNA is used in genotyping for parental verification and genomic evaluation. The genomic evaluation for production, health, fertility and other physiological traits utilized in certain embodiments of the invention is based on analysis of SNP data from historical reference population data determined by genome-wide association studies (GWAS). This evaluation of fetal cells also allows for rapid generation modeling by allowing pre-selection of fetus as a parent for the next generation of matings. The remaining cells in culture remain in cell culture for passage and eventual harvest and cryopreservation for later diagnostic, cytogenetic and biological productive use such as cloning.

By way of example, the following DNA extraction and amplification procedure may be used in certain embodiments of the invention. One skilled in the art will know that variations on this method exist and that this method should not be construed to limit the functionality or scope of the current invention. This method is illustrative only.

Fibroblast DNA is extracted from the contents of a 25-cm2 culture bottle by the salting-out procedure, with minor modifications (Miller et al., 1988; Biase et al., 2002). Fifty nanograms of genomic DNA is used in 25 μL of PCR mix (1 U Taq polymerase, 100 μM dNTP, 1 mM MgCl2, 5 pmol of each primer) and amplified 36 times using the following conditions: 93° C. for 3 min, 93° C. for 40 s, 58° C. for 40 seconds, 72° C. for 40 seconds, and 72° C. for 5 min. The primers are designed to amplify a 410-bp fragment of the NeoR gene (sense: 5'-GAG-GCT-ATT-CGG-CTA-TGA-CTG-3' and anti-sense: 5'-TCG-ACA-AGA-CCG-GCT-TCC-ATC-3') and a 262-bp fragment of bovine satellite I DNA (Gaillard et al., 1981) (sense: 5'-AGG-TCG-CGA-GAT-TGG-TCG-CTA-GGT-CAT-GCA-3' and anti-sense: 5'-AAG-ACC-TCG-AGA-GAC-CCT-CTT-CAA-CAC-GT-3').

In certain embodiments of the invention, DNA from amniocytes and mesenchymal stem cells can be extracted using the Purelink Genomic Kit Cat #K1820-00 (Invitrogen). In further embodiments, once the DNA is extracted, it can be put through a whole genome amplification protocol using the Illustra Genomiphi V2 DNA amplification kit (GE Lifesciences), which uses the phi29 DNA polymerase to amplify the genome.

In other embodiments of the invention the following DNA extraction procedure is employed.

Cells exposed to culture media often contain fetal calf serum. Due to high levels of DNase commonly found in fetal calf serum and the presence of cations that could catalyze the hydrolytic cleavage of phosphodiester linkage in DNA, an equal volume of a solution containing Tris-EDTA is added to the harvested cells to chelate cations essential for DNase activity. After adding the Tris-EDTA, the cell suspension is then stored in 1.5 ml microcentrifuge tubes at 4° C. until required for DNA extraction.

The 1.5 ml tubes containing cell suspension are spun at ≥10000×g in a microcentrifuge for 45 seconds to pellet cells. The suspension solution is pipetted off carefully so as to not remove pelleted cells. Approximately 50 µl of suspension solution is left in the tube. The tubes are then vortexed for 10 seconds to resuspend the cell pellets. 300 µl of Tissue and Cell Lysis Solution (Epicentre; Madison Wisconsin) containing 1 µl of Proteinase K (Epicentre; Madison Wisconsin) are then added to each tube and mixed. The tubes are then incubated at 65° C. for 30 minutes while making sure to vortex at 15 minutes. The samples are then cooled to 37° C. Afterwards 1 µl of 5 mg/µl RNase A (Epicentre; Madison Wisconsin) is added to each sample and then mixed. The samples are then incubated at 37° C. for 30 minutes. The samples are then placed in a 4° C. cooler for 5 minutes. 175 µl of MPC Protein Precipitation Reagent (Epicentre; Madison Wisconsin) are then added to each sample, and the samples are then vortexed vigorously for 10-15 seconds. The samples are then centrifuged in order to pellet debris for 8 minutes at ≥10000×g. The supernatant is then transferred to a clean microcentrifuge tube. 600 µl of cold (−20° C.) isopropanol is added to the supernatant. Each tube is then inverted 30-40 times. The DNA is then pelleted by centrifugation for 8 minutes in a microcentrifuge at ≥10000×g. The isopropanol is poured off without dislodging DNA pellet. The pellet is rinsed once with 70% ethanol and then the ethanol is carefully poured off so as not to disturb the DNA pellet. The residual ethanol is then removed with a pipet, and the DNA pellet is allowed to air dry in the microcentrifuge tube. Once dried, resuspend the DNA pellet in 20 µl Tris-EDTA.

Genotyping DNA

In one aspect of the invention, extracted and/or amplified DNA from amniocytes and mesenchymal stem cells may be genotyped using SNP arrays or chips, which are readily available for various species of animals from companies such as Illumina and Affymetrix. For purposes of the invention, the term "genotyping" includes, but is not limited to, obtaining SNP and/or copy number variation (CNV) data from DNA. For purposes of the invention, the term "genotype" includes, but is not limited to, SNP and/or copy number variation (CNV) data obtained from DNA. Low density and high density chips are contemplated for use with the invention, including SNP arrays comprising from 3,000 to 800,000 SNPs. By way of example, a "50K" SNP chip measures approximately 50,000 SNPs and is commonly used in the livestock industry to establish genetic merit or genomic estimated breeding values (GEBVs). In certain embodiments of the invention, any of the following SNP chips may be used: BovineSNP50 v1 BeadChip (Illumina), Bovine SNP v2 BeadChip (Illumina), Bovine 3K BeadChip (Illumina), Bovide LD BeadChip (Illumina), Bovine HD BeadChip (Illumina), Geneseek® Genomic Profiler™ LD BeadChip, or Geneseek® Genomic Profiler™ HD BeadChip.

Determining GEBVs from SNP Data

The basis, and algorithm, for using SNPs in determining GEBVs is found in Meuwissen et al., "Prediction of total genetic value using genome-wide dense marker maps," Genetics 157, 1819 1829 (2001), which is incorporated by reference herein in its entirety. Implementation of genomic data in predictions for desirable traits is found in Van Raden, "Efficient Methods to Compute Genomic Predictions," Dairy Science 91, 4414 4423 (2008), which is incorporated by reference herein in its entirety.

Livestock in the United States are often ranked using selection indexes that incorporate data related to various commercially important traits. With the advent of genomic testing, genomic data is now commonly used to predict these traits. To calculate an animal's score for a genomic selection index, one must first calculate the animal's GEBVs for each trait in the index, which can be accomplished using the teachings in Meuwissen et al. and VanRaden, above. Next, one determines the economic weight for each trait in the index. Finally, to determine the animal's score for the selection index, multiply each trait's GEBV by its economic weight and then sum all of these values together.

A genomic index commonly used in the United States for dairy cattle is the Genomic Total Performance Index (GTPI®), which is comprised of the following traits: protein; feed efficiency; dairy form; feet and legs composite; somatic cell score; daughter calving ease; fat; udder composite; productive life; fertility index; and daughter stillbirth. In certain embodiments, feed efficiency is equal to the dollar value of milk produced less feed costs for extra milk and less extra maintenance costs, and the fertility index is a function of heifer conception rate, cow conception rate and daughter pregnancy rate. In other embodiments of the invention, GEBV is used to determine Genomic Predicted Transmitting Ability (GPTA).

By way of example, in addition to determining a GEBV for a trait, the presence or absence of any of the following diseases and/or traits can be detected using SNP data or genomic data: Demetz syndrome; white heifer disease; Weaver syndrome (haplotype BHW); haplotype HHD; haplotype HH1; lethal brachygnathia trisomy syndrome; haplotype HH0; bovine hereditary cardiomyopathy; bovine dilated cardiomyopathy; neuronal ceroid lipofuscinosis; bovine chondrodysplastic dwarfism; notched ears/nicked ears; idiopathic epilepsy; bilateral convergent strabismus with exophthalmos; haplotype BHP; haplotype HHP; haplotype JHP; neuropathic hydrocephalus/water head; congenital hypotrichosis and anodontia defect/ectodermal dysplasia; ichthyosis fetalis; lethal trait A46/bovine hereditary zinc deficiency; Marfan Syndrome; double muscling; multiple ocular defects; bovine ocular squamous cell carcinoma; pink tooth; posterior paralysis/hind-limb paralysis; haplotype BHM; bovine spongiform encephalopathy/mad cow disease; mule foot disease (haplotype HHM); myophosphorylase deficiency; dropsy; black/red coat color (haplotype HBR; haplotype HEIR); BAND3 deficiency; Charolais ataxia; bovine spinal dysmyelination (haplotype BHD); Dun coat color in Dexter cattle; bovine familial convulsions and ataxia; bulldog calf; simmental hereditary thrombopathy; GHRD; renal tubular dysplasia (RTD)/chronic interstitial nephritis; Hereford white face; haplotype HHC; developmental duplications; black kidney; cardiomyopathy/Japanese black cattle; crooked tail syndrome; congenital pseudomyotonia; bovine hereditary arthrogyposis multiplex congentia; belted; Syndrome d'Hypoplasie Généralisée Capréoliforme; fawn calf syndrome; bovine neonatal pancytopenia; rat-tail syndrome; cheilognathoschisis; German White Fleckvieh syndrome; haplotype JH1; paunch calf syndrome; acorn calf disease/congenital joint laxity and dwarfism; haplotype HH2; haplotype HH3; haplotype HH4; Holstein bull-dog dwarfism; haplotype AH1; haplotype HH5; haplotype JH2; and lethal arthrogyposis syndrome.

Cloning

An additional aspect of the invention encompasses cloning embryos and/or fetuses that have been genomically evaluated using the techniques disclosed herein. Cloning is generally understood to be the creation of a living animal/organism that is essentially genetically identical to the unit or individual from which it was produced. In those embodiments of the invention that encompass cloned embryos and/or fetuses, any method by which an animal can be cloned that is known in the art can be utilized. Thus, it is contemplated that cloned embryos and cloned fetuses are produced by any conventional method known in the art. In one aspect of the invention, a basis for cloning an embryo or a fetus is its genomic merit. In a further aspect, the embryo or fetus's genetic merit is determined by genomic analysis as disclosed herein.

Example 1

Application of the Invention in a Population of Holstein Animals

Based on the official US breeding values, the genomic (SNP) data and estimates of marker effects, variances in gamete breeding values have been estimated for a dataset that comprises 57,326 Holstein animals.

Distribution of Gamete Variances

In FIG. 3 the distributions of genomic standard deviations in the gametes of all individuals are displayed. One remarkable observation here is the bi(multi)-modality of the density for the traits milk and fat. This is caused by the major QTL DGAT which has a high impact on those traits. That QTL splits the population of animals with respect to their gamete variances for milk and fat into two subpopulations. One population (lower mean variance) is homozygous for one of the alleles, and the other population is heterozygous (DGAT is generating variation in gamete breeding values).

Using Estimates of Gamete Variation in a Breeding Program

One aspect of the instant invention is to predict and optimize the outcome of matings. In Holstein breeding, for example, it is, at least at the moment, of tremendous commercial importance to place animals at the top of a ranked list according to breeding value. In this Example, in total there were 4560 animals with genotypes and genotyped parents, comprising 284 unique sires and 2025 unique dams.

For every animal in that dataset, its expected breeding value and variance has been estimated based on its parents and using the method described above. Averaging those estimates across all animals in the dataset, we end up with a joint distribution for the whole offspring group.

FIGS. 4A-4J show the top 10 to 20% of the given animals and the predicted (by the invention and by parent average) and observed number of animals that exceed thresholds given by the x-axis for various dairy animal traits and selection indexes—specifically: Cheese Merit index (i.e., "CM$" or "Cheese Merit Dollars"), which is an index designed for producers who sell milk in a cheese market (Protein has more value in the cheese market than it does in the standard component pricing market; the Milk trait receives a negative economic weight in the Cheese Merit index); Daughter Pregnancy Rate ("DPR") trait, which is generally defined as the percentage of non-pregnant cows that become pregnant during each 21-day period and takes into account how quickly cows come back into heat after calving and conception rate when bred; Fat trait (pounds of fat produced); Future Inbreeding (i.e., effective future inbreeding), which is an estimate, based on pedigree, of the level of inbreeding that the progeny of a given animal will contribute in the population if mated at random; Milk trait (pounds of milk produced); Net Merit index (i.e., "NM$" or "Net Merit Dollars"), which estimates the lifetime profitability of an animal based on various production, health and type traits; Productive Life trait, which gives a measure of the amount of time a cow stays in the herd as a productive animal and represents how many months of additional (or fewer, if a negative number) lifetime you can expect from a bull's daughters; Protein trait (pounds of protein produced); PTA Type ("PTAT"), which is an estimate of the genetic superiority that a bull will transmit to its offspring; TPI® ("Total Performance Index®"), which is a dairy industry index comprised of various production, health and type traits for dairy animals.

Based on the available cohort, the overlap between the observed distributions of EBVs and the distributions of EBVs predicted by the invention was significantly better compared to the overlap with distributions of EBVs predicted by the parent average. See Tables 1 to 10 below (DPR=daughter pregnancy rate; PTAT=PTA Type; TPI®=Total Performance Index®). These results confirm that parent average is by its nature unable to accurately predict the tails of a distribution.

The gamete variances can be used for the prediction of the whole EBV distribution of an offspring group, but the main interest for breeders lies in the very right tail of that distribution, meaning the probabilities of exceeding an EBV that exceeds the mean plus 2 or 3 standard deviations. The following tables show the observed and predicted numbers of animals in the cohort of 4560 animals to exceed a certain EBV threshold (column EBV) for EBVs higher than the mean plus 3 standard deviations of the present sample.

TABLE 1

Observed and predicted number of animals to exceed EBV threshold for Cheese Merit

| EBV | Observed | Invention | Parent Average |
| --- | --- | --- | --- |
| 2786.75 | 45 | 52.37 | 8 |
| 2802.09 | 36 | 38.06 | 4 |
| 2817.42 | 24 | 27.18 | 2 |
| 2832.75 | 15 | 19.07 | 1 |
| 2848.08 | 8 | 13.14 | 1 |

TABLE 1-continued

Observed and predicted number of animals to exceed EBV threshold for Cheese Merit

| EBV | Observed | Invention | Parent Average |
|---|---|---|---|
| 2863.42 | 6 | 8.90 | 0 |
| 2878.75 | 5 | 5.92 | 0 |
| 2894.08 | 4 | 3.87 | 0 |
| 2909.41 | 2 | 2.49 | 0 |
| 2924.75 | 1 | 1.57 | 0 |
| 2940.08 | 1 | 0.97 | 0 |
| 2955.41 | 1 | 0.59 | 0 |
| 2970.74 | 0 | 0.35 | 0 |
| 2986.07 | 0 | 0.21 | 0 |
| 3001.41 | 0 | 0.12 | 0 |
| 3016.74 | 0 | 0.07 | 0 |
| 3032.07 | 0 | 0.04 | 0 |
| 3047.40 | 0 | 0.02 | 0 |
| 3062.74 | 0 | 0.01 | 0 |
| 3078.07 | 0 | 0.00 | 0 |

TABLE 2

Observed and predicted number of animals to exceed EBV threshold for DPR

| EBV | Observed | Invention | Parent Average |
|---|---|---|---|
| 5.38 | 40 | 26.71 | 5 |
| 5.52 | 32 | 20.70 | 4 |
| 5.66 | 27 | 15.98 | 4 |
| 5.80 | 24 | 12.30 | 4 |
| 5.93 | 16 | 9.46 | 4 |
| 6.07 | 12 | 7.26 | 3 |
| 6.21 | 9 | 5.58 | 3 |
| 6.35 | 8 | 4.28 | 3 |
| 6.49 | 6 | 3.29 | 3 |
| 6.62 | 5 | 2.52 | 0 |
| 6.76 | 4 | 1.92 | 0 |
| 6.90 | 3 | 1.46 | 0 |
| 7.04 | 2 | 1.10 | 0 |
| 7.18 | 2 | 0.82 | 0 |
| 7.31 | 0 | 0.60 | 0 |
| 7.45 | 0 | 0.43 | 0 |
| 7.59 | 0 | 0.31 | 0 |
| 7.73 | 0 | 0.21 | 0 |
| 7.86 | 0 | 0.14 | 0 |
| 8.00 | 0 | 0.10 | 0 |

TABLE 3

Observed and predicted number of animals to exceed EBV threshold for Fat

| EBV | Observed | Invention | Parent Average |
|---|---|---|---|
| 100.56 | 25 | 31.64 | 9 |
| 102.33 | 15 | 23.68 | 4 |
| 104.11 | 12 | 17.58 | 4 |
| 105.88 | 10 | 12.97 | 4 |
| 107.65 | 6 | 9.50 | 4 |
| 109.43 | 5 | 6.92 | 4 |
| 111.20 | 2 | 5.01 | 0 |
| 112.97 | 2 | 3.60 | 0 |
| 114.75 | 1 | 2.56 | 0 |
| 116.52 | 0 | 1.81 | 0 |
| 118.29 | 0 | 1.26 | 0 |
| 120.07 | 0 | 0.87 | 0 |
| 121.84 | 0 | 0.59 | 0 |
| 123.61 | 0 | 0.39 | 0 |
| 125.39 | 0 | 0.25 | 0 |
| 127.16 | 0 | 0.16 | 0 |
| 128.93 | 0 | 0.10 | 0 |
| 130.71 | 0 | 0.06 | 0 |

TABLE 3-continued

Observed and predicted number of animals to exceed EBV threshold for Fat

| EBV | Observed | Invention | Parent Average |
|---|---|---|---|
| 132.48 | 0 | 0.03 | 0 |
| 134.25 | 0 | 0.02 | 0 |

TABLE 4

Observed and predicted number of animals to exceed EBV threshold for Future Inbreeding

| EBV | Observed | Invention | Parent Average |
|---|---|---|---|
| 8.89 | 95 | 90.63 | 44 |
| 8.93 | 51 | 74.56 | 29 |
| 8.97 | 51 | 60.94 | 18 |
| 9.00 | 29 | 49.47 | 12 |
| 9.04 | 29 | 39.88 | 12 |
| 9.08 | 29 | 31.92 | 12 |
| 9.12 | 17 | 25.36 | 9 |
| 9.16 | 17 | 19.99 | 9 |
| 9.20 | 17 | 15.63 | 9 |
| 9.23 | 7 | 12.11 | 1 |
| 9.27 | 7 | 9.30 | 1 |
| 9.31 | 4 | 7.07 | 0 |
| 9.35 | 4 | 5.32 | 0 |
| 9.39 | 4 | 3.95 | 0 |
| 9.43 | 1 | 2.90 | 0 |
| 9.46 | 1 | 2.10 | 0 |
| 9.50 | 1 | 1.50 | 0 |
| 9.54 | 1 | 1.05 | 0 |
| 9.58 | 1 | 0.73 | 0 |
| 9.62 | 1 | 0.49 | 0 |

TABLE 5

Observed and predicted number of animals to exceed EBV threshold for Milk

| EBV | Observed | Invention | Parent Average |
|---|---|---|---|
| 2383.99 | 11 | 14.11 | 2 |
| 2434.43 | 8 | 9.99 | 1 |
| 2484.86 | 7 | 7.00 | 0 |
| 2535.29 | 4 | 4.84 | 0 |
| 2585.73 | 4 | 3.30 | 0 |
| 2636.16 | 1 | 2.23 | 0 |
| 2686.60 | 1 | 1.48 | 0 |
| 2737.03 | 0 | 0.97 | 0 |
| 2787.46 | 0 | 0.63 | 0 |
| 2837.90 | 0 | 0.40 | 0 |
| 2888.33 | 0 | 0.25 | 0 |
| 2938.76 | 0 | 0.15 | 0 |
| 2989.20 | 0 | 0.09 | 0 |
| 3039.63 | 0 | 0.05 | 0 |
| 3090.06 | 0 | 0.03 | 0 |
| 3140.50 | 0 | 0.02 | 0 |
| 3190.93 | 0 | 0.01 | 0 |
| 3241.37 | 0 | 0.00 | 0 |
| 3291.80 | 0 | 0.00 | 0 |
| 3342.23 | 0 | 0.00 | 0 |

TABLE 6

Observed and predicted number of animals to exceed EBV threshold for Net Merit

| EBV | Observed | Invention | Parent Average |
|---|---|---|---|
| 907.55 | 55 | 58.52 | 4 |
| 919.84 | 37 | 42.74 | 2 |

TABLE 6-continued

Observed and predicted number of animals
to exceed EBV threshold for Net Merit

| EBV | Observed | Invention | Parent Average |
|---|---|---|---|
| 932.13 | 23 | 30.63 | 2 |
| 944.42 | 15 | 21.53 | 0 |
| 956.70 | 11 | 14.84 | 0 |
| 968.99 | 6 | 10.02 | 0 |
| 981.28 | 3 | 6.62 | 0 |
| 993.57 | 3 | 4.28 | 0 |
| 1005.86 | 3 | 2.71 | 0 |
| 1018.15 | 2 | 1.67 | 0 |
| 1030.44 | 2 | 1.01 | 0 |
| 1042.72 | 2 | 0.59 | 0 |
| 1055.01 | 1 | 0.34 | 0 |
| 1067.30 | 0 | 0.19 | 0 |
| 1079.59 | 0 | 0.10 | 0 |
| 1091.88 | 0 | 0.06 | 0 |
| 1104.17 | 0 | 0.03 | 0 |
| 1116.46 | 0 | 0.01 | 0 |
| 1128.74 | 0 | 0.01 | 0 |
| 1141.03 | 0 | 0.00 | 0 |

TABLE 7

Observed and predicted number of animals to
exceed EBV threshold for Productive Life

| EBV | Observed | Invention | Parent Average |
|---|---|---|---|
| 8.70 | 75 | 73.07 | 19 |
| 8.84 | 63 | 57.49 | 16 |
| 8.98 | 58 | 44.82 | 11 |
| 9.12 | 39 | 34.62 | 10 |
| 9.27 | 35 | 26.50 | 6 |
| 9.41 | 24 | 20.09 | 6 |
| 9.55 | 22 | 15.09 | 4 |
| 9.69 | 17 | 11.21 | 1 |
| 9.83 | 11 | 8.24 | 0 |
| 9.97 | 9 | 5.99 | 0 |
| 10.11 | 5 | 4.30 | 0 |
| 10.25 | 4 | 3.05 | 0 |
| 10.39 | 2 | 2.13 | 0 |
| 10.53 | 0 | 1.46 | 0 |
| 10.67 | 0 | 0.99 | 0 |
| 10.81 | 0 | 0.65 | 0 |
| 10.96 | 0 | 0.43 | 0 |
| 11.10 | 0 | 0.27 | 0 |
| 11.24 | 0 | 0.17 | 0 |
| 11.38 | 0 | 0.10 | 0 |

TABLE 8

Observed and predicted number of animals
to exceed EBV threshold for Protein

| EBV | Observed | Invention | Parent Average |
|---|---|---|---|
| 71.76 | 23 | 26.97 | 5 |
| 73.00 | 13 | 20.14 | 4 |
| 74.25 | 11 | 14.86 | 2 |
| 75.49 | 11 | 10.83 | 2 |
| 76.74 | 9 | 7.79 | 2 |
| 77.98 | 9 | 5.54 | 2 |
| 79.22 | 6 | 3.88 | 0 |
| 80.47 | 2 | 2.68 | 0 |
| 81.71 | 1 | 1.83 | 0 |
| 82.96 | 1 | 1.23 | 0 |
| 84.20 | 1 | 0.81 | 0 |
| 85.44 | 1 | 0.53 | 0 |
| 86.69 | 0 | 0.34 | 0 |
| 87.93 | 0 | 0.21 | 0 |
| 89.18 | 0 | 0.13 | 0 |
| 90.42 | 0 | 0.08 | 0 |

TABLE 8-continued

Observed and predicted number of animals
to exceed EBV threshold for Protein

| EBV | Observed | Invention | Parent Average |
|---|---|---|---|
| 91.66 | 0 | 0.04 | 0 |
| 92.91 | 0 | 0.03 | 0 |
| 94.15 | 0 | 0.01 | 0 |
| 95.40 | 0 | 0.01 | 0 |

TABLE 9

Observed and predicted number of animals
to exceed EBV threshold for PTAT

| EBV | Observed | Invention | Parent Average |
|---|---|---|---|
| 3.15 | 29 | 38.64 | 21 |
| 3.21 | 27 | 31.37 | 20 |
| 3.26 | 15 | 25.31 | 19 |
| 3.32 | 13 | 20.28 | 12 |
| 3.37 | 12 | 16.11 | 7 |
| 3.43 | 7 | 12.66 | 4 |
| 3.48 | 5 | 9.84 | 3 |
| 3.54 | 5 | 7.54 | 0 |
| 3.59 | 2 | 5.69 | 0 |
| 3.65 | 2 | 4.22 | 0 |
| 3.70 | 0 | 3.07 | 0 |
| 3.76 | 0 | 2.18 | 0 |
| 3.81 | 0 | 1.52 | 0 |
| 3.87 | 0 | 1.03 | 0 |
| 3.92 | 0 | 0.68 | 0 |
| 3.97 | 0 | 0.44 | 0 |
| 4.03 | 0 | 0.28 | 0 |
| 4.08 | 0 | 0.17 | 0 |
| 4.14 | 0 | 0.10 | 0 |
| 4.19 | 0 | 0.06 | 0 |

TABLE 10

Observed and predicted number of animals to
exceed EBV threshold for TPI ®

| EBV | Observed | Invention | Parent Average |
|---|---|---|---|
| 2786.75 | 45 | 52.37 | 8 |
| 2802.09 | 36 | 38.06 | 4 |
| 2817.42 | 24 | 27.18 | 2 |
| 2832.75 | 15 | 19.07 | 1 |
| 2848.08 | 8 | 13.14 | 1 |
| 2863.42 | 6 | 8.90 | 0 |
| 2878.75 | 5 | 5.92 | 0 |
| 2894.08 | 4 | 3.87 | 0 |
| 2909.41 | 2 | 2.49 | 0 |
| 2924.75 | 1 | 1.57 | 0 |
| 2940.08 | 1 | 0.97 | 0 |
| 2955.41 | 1 | 0.59 | 0 |
| 2970.74 | 0 | 0.35 | 0 |
| 2986.07 | 0 | 0.21 | 0 |
| 3001.41 | 0 | 0.12 | 0 |
| 3016.74 | 0 | 0.07 | 0 |
| 3032.07 | 0 | 0.04 | 0 |
| 3047.40 | 0 | 0.02 | 0 |
| 3062.74 | 0 | 0.01 | 0 |
| 3078.07 | 0 | 0.00 | 0 |

Example 2

Optimization Using Estimates of Gamete Variances in a Mating Program

One aspect of the invention encompasses an optimization procedure as part of a general mating program. The optimization problem can be represented as a linear program in which the objective function is derived from the distribution of offspring given sire dam matings. For example, the objective function can be defined as the probability to generate offspring with breeding values exceeding the general population mean plus 3 standard deviations. The probability sum for the entity of all considered matings is then the figure that is to be maximized.

Formally, the objective function can be described as:

$$f(x)=c'x,$$

where c is a vector of probabilities to exceed a certain breeding value threshold for every sire dam combination. Hence, given $n_{Sires}$ of potential sires and $n_{Dams}$ dams, the length of the vector c is $n_{Sires} \times n_{Dams}$. x is a vector of integers representing the total number of matings per sire-dam combination. In addition to the objective function, such a linear program will always have a series of linear constraints on the variables, which can be formalized as:

$$Ax \leq b,$$

where A represents a matrix of factors multiplied with and summed over the whole range of x to give b, a vector of limits. E.g. one row of A could consists of all ones to give the total number of matings which is not to exceed the respective limit in b. Other constraints may include the maximum number of matings for every sire, every dam, and every sire-dam combination. The limits can be individual specific such that one sire might be allowed to generate 200 and another only 50 offspring. The linear constraint on the total number of offspring per sire-dam combination can be used to prevent matings of carriers of recessive diseases.

Another set of constraints forces the number of matings in total and on a per individual basis to be nonnegative and to reach a minimum total:

$$x \geq 0$$

The solution to this optimization problem can be obtained using the simplex method (Ferguson, Robert O., and Lauren F. Sargent. Linear Programming. McGraw-Hill, 1958).

Example of the Workflow

The basis for expectation and variance (given a normal distribution in the normal case) for an offspring group of a sire-dam combination are estimates of substitution effects for the available markers or genes. Those are being estimated using a large reference population of genotyped and phenotyped individuals. Alternatively, animals with already highly reliable conventional breeding values can be utilized in such a reference population. The second step is the definition of the optimization function. Typically this would be a figure that is derived from the distribution of breeding values in offspring groups. Examples include the probability of an offspring to exceed a certain breeding value threshold or to fall into a certain breeding value range. The last step is the consideration of scarce resources to enter the optimization step. Those resources include female recipients, female oocyte donors, male sperm and total capacity to house offspring. In addition, the total number of offspring per sire, dam and combinations thereof can be controlled. Defining constraints for the total number of offspring for certain male or female individuals that are nonnegative but allowed to be zero, allows the optimization procedure to also perform selection of the animals that enter the breeding program in general.

Simulation Procedure

Ten animals with genotypes on 3 SNP markers were simulated. The following marker effects (i.e. gene substitution effects) and minor allele frequencies (MAF) were used in the simulations.

| SNP Name | MAF | Marker Effect |
| --- | --- | --- |
| SNP 1 | 0.5 | −0.6548 |
| SNP 2 | 0.5 | −0.1896 |
| SNP 3 | 0.5 | 1.5768 |

The resulting numerical genotypes were simulated based on the given minor allele frequencies assuming Hardy-Weinberg-Equilibrium:

| | SNP 1 | SNP 2 | SNP 3 |
| --- | --- | --- | --- |
| ID 1 | 1 | 0 | 1 |
| ID 2 | 1 | 1 | 2 |
| ID 3 | 1 | 1 | 0 |
| ID 4 | 1 | 0 | 1 |
| ID 5 | 1 | 2 | 2 |
| ID 6 | 1 | 2 | 0 |
| ID 7 | 1 | 1 | 2 |
| ID 8 | 0 | 1 | 1 |
| ID 9 | 2 | 0 | 0 |
| ID 10 | 1 | 1 | 1 |

The resulting covariance matrix of marker covariates that is needed for the computation of gamete variances is as follows:

| | SNP 1 | SNP 2 | SNP 3 |
| --- | --- | --- | --- |
| SNP 1 | 0.2500 | −0.0799 | −0.0722 |
| SNP 2 | −0.0799 | 0.2500 | 0.0461 |
| SNP 3 | −0.0722 | 0.0461 | 0.2500 |

The marker effects were sampled from a normal distribution with zero mean and variance equal to one. Based on the genotypes and marker effects, genomic breeding values for the animals were computed by multiplying the matrix of marker covariates with the vector of marker effects. The PTA is half of that breeding value. In total, 2 males and 8 females were simulated. A summary of the individuals is given in the following table:

| ID | SEX | PTA | Var | Heterozygotes | Heterozygosity |
| --- | --- | --- | --- | --- | --- |
| ID 1 | M | 0.4610 | 0.8778 | 2 | 0.6667 |
| ID 2 | M | 1.1545 | 0.0964 | 2 | 0.6667 |
| ID 3 | F | −0.4222 | 0.0964 | 2 | 0.6667 |
| ID 4 | F | 0.4610 | 0.8778 | 2 | 0.6667 |
| ID 5 | F | 1.0597 | 0.1072 | 1 | 0.3333 |
| ID 6 | F | −0.5171 | 0.1072 | 1 | 0.3333 |
| ID 7 | F | 1.1545 | 0.0964 | 2 | 0.6667 |
| ID 8 | F | 0.6936 | 0.6030 | 2 | 0.6667 |
| ID 9 | F | −0.6548 | 0.0000 | 0 | 0.0000 |
| ID 10 | F | 0.3661 | 0.8394 | 3 | 1.0000 |

The optimization criteria in the following procedure will be the probability to exceed a defined breeding value threshold (PGT) in offspring. In this example, the threshold has been set to be the maximum observed breeding value plus 1 times the standard deviation of all breeding values. This led to a threshold of 3.6903.

The constraints for the linear program were as follows:

| Constraint | Evaluation | Value |
|---|---|---|
| Total matings | ≥ | 6 |
| Total matings | ≤ | 6 |
| Total matings per sire | ≥ | 0 |
| Total matings per sire | ≤ | 3 |
| Total matings per dam | ≥ | 0 |
| Total matings per dam | ≤ | 1 |
| Total matings per sire-dam-combination | ≥ | 1 |
| Total matings per sire-dam-combination | ≤ | 1 |

Results

Table 11, below, gives the results of the linear program which performed an optimization on the objective function given the constraints in place. The columns Dam and Sire represent the sire-dam-combination. The column PA gives the parent average, which is equal to the sum of the sire's and dam's PTAs. SD gives the standard deviation of breeding values on offspring of the particular sire-dam-combination. The column PGT represents the optimization criteria, which is the probability of an offspring to exceed the defined threshold. nMatingsPGT and nMatingsPA are the total number of matings assigned by the optimization routine given PGT or PA as the objective function. The last columns, nOffspringPGT and nOffspringPA, give the expected number of offspring exceeding the defined threshold.

The average probability to exceed the threshold given the optimum solution using PGT is 0.0135167, giving 0.0811 offspring exceeding the threshold. When the parent average (PA) is used as the objective function instead, the average probability to exceed the threshold drops to 0.0087667, giving 0.0526 offspring exceeding the threshold.

TABLE 11

| Dam | Sire | PA | SD | PGT | nMatingsPGT | nMatingsPA | nOffspringPGT | nOffspringPA |
|---|---|---|---|---|---|---|---|---|
| ID 3 | ID 1 | 0.0387 | 0.9870 | 0.0001 | 0 | 0 | 0.0000 | 0.0000 |
| ID 4 | ID 1 | 0.9219 | 1.3250 | 0.0183 | 0 | 1 | 0.0000 | 0.0183 |
| ID 5 | ID 1 | 1.5207 | 0.9925 | 0.0144 | 1 | 0 | 0.0144 | 0.0000 |
| ID 6 | ID 1 | −0.0561 | 0.9925 | 0.0001 | 0 | 0 | 0.0000 | 0.0000 |
| ID 7 | ID 1 | 1.6155 | 0.9870 | 0.0178 | 1 | 0 | 0.0178 | 0.0000 |
| ID 8 | ID 1 | 1.1545 | 1.2169 | 0.0186 | 1 | 1 | 0.0186 | 0.0186 |
| ID 9 | ID 1 | −0.1939 | 0.9369 | 0.0000 | 0 | 0 | 0.0000 | 0.0000 |
| ID 10 | ID 1 | 0.8271 | 1.3104 | 0.0144 | 0 | 1 | 0.0000 | 0.0144 |
| ID 3 | ID 2 | 0.7323 | 0.4390 | 0.0000 | 1 | 1 | 0.0000 | 0.0000 |
| ID 4 | ID 2 | 1.6155 | 0.9870 | 0.0178 | 1 | 0 | 0.0178 | 0.0000 |
| ID 5 | ID 2 | 2.2142 | 0.4512 | 0.0005 | 0 | 1 | 0.0000 | 0.0005 |
| ID 6 | ID 2 | 0.6375 | 0.4512 | 0.0000 | 0 | 0 | 0.0000 | 0.0000 |
| ID 7 | ID 2 | 2.3091 | 0.4390 | 0.0008 | 0 | 1 | 0.0000 | 0.0008 |
| ID 8 | ID 2 | 1.8481 | 0.8363 | 0.0138 | 0 | 0 | 0.0000 | 0.0000 |
| ID 9 | ID 2 | 0.4997 | 0.3104 | 0.0000 | 0 | 0 | 0.0000 | 0.0000 |
| ID 10 | ID 2 | 1.5207 | 0.9673 | 0.0125 | 1 | 0 | 0.0125 | 0.0000 |

Figure 5:
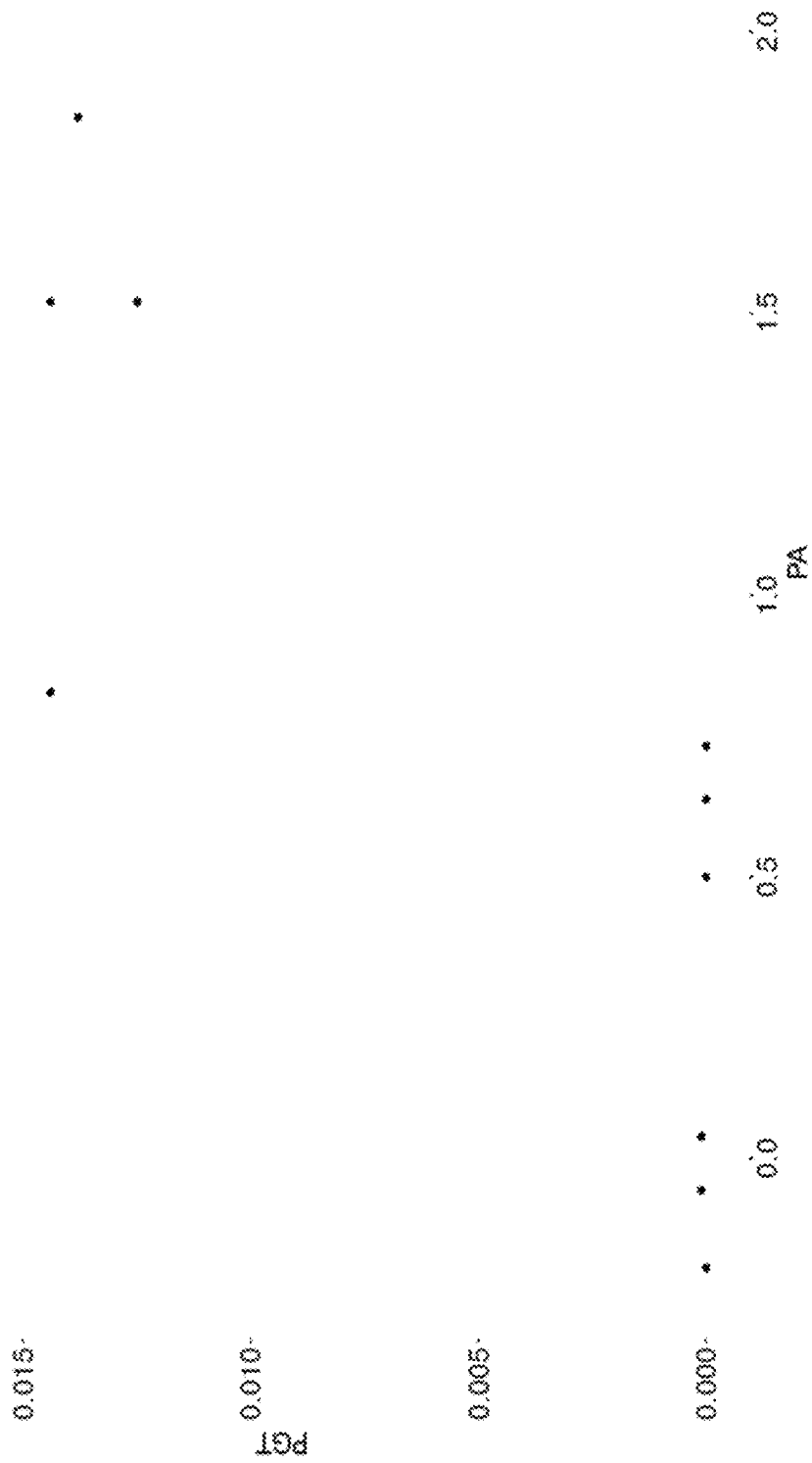
FIG. 5 is a dot plot showing that the invention ("PGT") is a superior method of predicting the probability of generating extreme offspring compared to the use of parent average ("PA").

FIG. 5 is a dot plot showing that the invention is a superior method of predicting the probability of generating extreme offspring compared to the use of parent average.

Embodiments of the Invention

A. A method of estimating a distribution or a standard deviation of gametes comprising:
estimating a distribution or a standard deviation of i) breeding values or ii) predicted transmitting abilities (PTAs) of gametes from an individual using population-wide estimates of linkage disequilibrium for one or more genetic markers or genes.

B. The method of A, further comprising the step of selecting the individual for breeding based on the estimated distribution or estimated standard deviation of breeding values or PTAs of the gametes.

C. The method of A or B, further comprising the step of breeding the individual.

D. The method of any one of A to C, further comprising the step of producing offspring from the breeding.

E. The method of any one of A to D, wherein the step of selecting comprises selecting the individual for breeding based upon an estimated standard deviation of breeding values or PTAs of the gametes that exceeds an average standard deviation of a distribution of standard deviations of breeding values or PTAs of gametes of the population by at least one standard deviation from the average.

F. The method of any one of A to E, wherein the step of estimating is independent of genotype imputation, haplotype estimation or recombination information.

G. The method of any one of A to F, wherein the step of estimating is performed by establishing a set of genetic markers or genes for which genotype data is available for the individual and wherein genetic marker effects or gene effects are estimated for the set of genetic markers or genes.

H. A method of estimating a distribution or a standard deviation of gametes comprising:
estimating a standard deviation of i) breeding values or ii) PTAs of gametes from an individual using population-wide estimates of linkage disequilibrium for one or more genetic markers or genes; and
calculating a probability of generating gametes from the individual that have desired breeding values or PTAs.

I. The method of H, further comprising the step of selecting the individual for breeding based on the calculated probability.

J. The method of H or I, further comprising the step of breeding the individual.

K. The method of any one of H to J, further comprising the step of producing offspring from the breeding.

L. The method of any one of H to K, wherein the desired breeding values or PTAs exceed an average breeding value or PTA of the population.

M. The method of any one of H to L, wherein the desired breeding values or PTAs exceed an average breeding value or PTA of the population by one or more standard deviations from the average.

N. The method of any one of H to M, wherein the desired breeding values or PTAs fall within the top 20 percent of breeding values or PTAs of the population.

O. The method of any one of H to N, wherein the step of estimating is independent of genotype imputation, haplotype estimation or recombination information.

P. The method of any one of H to O, wherein the step of estimating is performed by establishing a set of genetic markers or genes for which genotype data is available for the individual and wherein genetic marker effects or gene effects are estimated for the set of genetic markers or genes.

Q. A method of calculating a probability that offspring will have a breeding value or a PTA that equals or exceeds a desired breeding value or PTA comprising:
estimating a distribution or a standard deviation of i) breeding values or ii) PTAs (predicted transmitting abilities) of gametes from a male of the species, and from a female of the species, using population-wide estimates of linkage disequilibrium for one or more genetic markers or genes; and
calculating a probability that offspring produced from a mating of the male and the female will have a breeding value or PTA that equals or exceeds a desired breeding value or PTA.

R. The method of Q, further comprising the step of breeding the male and the female when the calculated probability equals or exceeds a desired probability;

S. The method of Q or R, further comprising the step of producing offspring from the breeding.

T. The method of any one of Q to S, wherein the desired breeding value or PTA exceeds an average breeding value or PTA of the population.

U. The method of any one of Q to T, wherein the desired breeding value or PTA exceeds an average breeding value or PTA of the population by one or more standard deviations from the average.

V. The method of any one of Q to U, wherein the desired breeding value or PTA falls within the top 20 percent of breeding values or PTAs of the population.

W. The method of any one of Q to V, wherein the step of estimating is independent of genotype imputation, haplotype estimation or recombination information.

X. The method of any one of Q to W, wherein the step of estimating is performed by establishing a set of genetic markers or genes for which genotype data is available for the individual and wherein genetic marker effects or gene effects are estimated for the set of genetic markers or genes.

Y. A method of maximizing an objective function comprising:
providing an objective function, wherein said objective function is defined by a first variable comprising a vector of probabilities to generate offspring having a breeding value or a PTA equal to or greater than a desired breeding value or PTA for every male-female combination from the one or more males and the one or more females, and a second variable comprising a vector of integers representing a number of matings for every male-female combination from the one or more males and the one or more females;
applying one or more linear constraints to the first or the second variable; and
determining a vector of integers representing the number of matings for every male-female combination that maximizes the objective function given the linear constraints.

Z. The method of Y, further comprising the step of breeding a male from the one or more males and a female from the one or more females with each other when the integer representing the number of matings for that male-female combination is equal to or greater than 1.

Z1. The method of Y or Z, further comprising the step of producing offspring from the breeding.

Z2. The method of any one of Y to Z1, wherein the desired breeding value or PTA exceeds an average breeding value or PTA of the population.

Z3. The method of any one of Y to Z2, wherein the desired breeding value or PTA exceeds an average breeding value or PTA of the population by one or more standard deviations from the average.

Z4. The method of any one of Y to Z3, wherein the desired breeding value or PTA falls within the top 20 percent of breeding values or PTAs of the population.

Z5. The method of any one of Y to Z4, further comprising the step of estimating a distribution or a standard deviation of i) breeding values or ii) PTAs (predicted transmitting abilities) of gametes from the one or more males or the one or more females using population-wide estimates of linkage disequilibrium for one or more genetic markers or genes.

Z6. The method of Z5, wherein the step of estimating is independent of genotype imputation, haplotype estimation or recombination information.

Z7. The method of Z5 or Z6, wherein the step of estimating is performed by establishing a set of genetic markers or genes for which genotype data is available for the individual and wherein genetic marker effects or gene effects are estimated for the set of genetic markers or genes.

Z8. The method of any one of Y to Z7, wherein the one or more linear constraints is selected from the group consisting of: a maximum or minimum number of matings for each male or each female; a maximum or minimum number of matings for each male-female combination; a maximum or minimum number of offspring for a male or a female; and a maximum number of offspring for each male-female combination.

Z9. The method of any one of Y to Z8, wherein the step of determining the vector of integers representing the number of matings for every male-female combination that maximizes the objective function comprises using a simplex method.

Although the foregoing invention has been described in some detail, one of ordinary skill in the art will understand that certain changes and modifications may be practiced within the scope of the claims.

What I claim is:

1. A method of producing offspring from an individual in a population comprising:
estimating a distribution or a standard deviation of i) breeding values or ii) predicted transmitting abilities (PTAs) of gametes from an individual using an estimate of linkage disequilibrium for one or more genetic markers or genes;
selecting the individual for breeding based on the estimated distribution or estimated standard deviation of breeding values or PTAs of the gametes;
breeding the individual; and
producing offspring from the breeding.

2. The method of claim 1, wherein the step of selecting comprises selecting the individual for breeding based upon an estimated standard deviation of breeding values or PTAs of the gametes that exceeds an average standard deviation of a distribution of standard deviations of breeding values or PTAs of gametes of the population by at least one standard deviation from the average.

\* \* \* \* \*